US009786118B2

(12) United States Patent
Kido et al.

(10) Patent No.: US 9,786,118 B2
(45) Date of Patent: Oct. 10, 2017

(54) GAMING SYSTEM FOR NAVIGATING ADVANCEMENT OF GAME FOR DEALER

(75) Inventors: Katsuhiro Kido, Koto-ku (JP); Kenta Kitamura, Koto-ku (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1292 days.

(21) Appl. No.: 13/123,154

(22) PCT Filed: Oct. 22, 2009

(86) PCT No.: PCT/JP2009/068178
§ 371 (c)(1),
(2), (4) Date: Apr. 7, 2011

(87) PCT Pub. No.: WO2010/050398
PCT Pub. Date: May 6, 2010

(65) Prior Publication Data
US 2011/0201400 A1 Aug. 18, 2011

Related U.S. Application Data

(60) Provisional application No. 61/109,012, filed on Oct. 28, 2008.

(51) Int. Cl.
*A63F 13/00* (2014.01)
*G07F 17/32* (2006.01)

(52) U.S. Cl.
CPC ............ *G07F 17/322* (2013.01); *G07F 17/32* (2013.01)

(58) Field of Classification Search
CPC ............... G07F 17/3293; G07F 17/322; G07F 17/3276; G07F 17/3272
See application file for complete search history.

(56) References Cited

U.S. PATENT DOCUMENTS 7,419,160 B1 9/2008 D'Ambrosio
2003/0137110 A1* 7/2003 Huard ..................... G07F 17/32 273/292
2006/0071429 A1 4/2006 Okujyo et al.
2006/0281537 A1* 12/2006 Abbott .................. G06Q 20/20 463/25
2007/0105618 A1* 5/2007 Steil ................................ 463/25
2007/0173318 A1* 7/2007 Abbott ............................ 463/25
(Continued)

FOREIGN PATENT DOCUMENTS

JP 2005 168664 6/2005
JP 3123290 7/2006
(Continued)

OTHER PUBLICATIONS

International Search Report dated Dec. 1, 2009 in PCT/JP09/68178 filed Oct. 22, 2009.

*Primary Examiner* — David L Lewis
*Assistant Examiner* — Eric M Thomas
(74) *Attorney, Agent, or Firm* — Lex IP Meister, PLLC

(57) ABSTRACT

A gaming system comprises a control unit quipped with a controller. The control starts the reception of bets from a plurality of stations, displays, on a dealer display, termination order images from the plurality of the stations in accordance with a lapse of a predetermined period of time from the start of the bet reception, and advances the game on the condition that a bet termination order signal is received from an operation input button.

2 Claims, 22 Drawing Sheets

(56) References Cited

U.S. PATENT DOCUMENTS

| | | | | |
|---|---|---|---|---|
| 2008/0064467 | A1* | 3/2008 | Reiner | G07F 17/3267 463/16 |
| 2008/0217855 | A1 | 9/2008 | Sloan | |
| 2009/0124323 | A1* | 5/2009 | Dunn | G07F 17/3211 463/17 |

FOREIGN PATENT DOCUMENTS

| | | |
|---|---|---|
| JP | 2006 280842 | 10/2006 |
| JP | 2007 229259 | 9/2007 |
| JP | 2008 526389 | 7/2008 |

* cited by examiner

5 SECONDS AFTER BET START

GAMING SYSTEM FOR NAVIGATING ADVANCEMENT OF GAME FOR DEALER

TECHNICAL FIELD

The present invention relates to a gaming system that navigates a dealer in game advancement.

BACKGROUND ART

Various table games are known conventionally, and among the table games, there exists a game genre called card games.

Among card games, for example, there is a game called baccarat as disclosed in the specification of U.S. Pat. No. 7,419,160. Here, baccarat is a game in which bets are made on any of a "Player (player position)", "Banker (banker position)", and "Tie (draw)" (however, there may be a case in which "Tie" is not a target for betting), which are the bet targets, and awards winnings, based on the bet amount that is bet, to a player having bet on a bet target of a winning side. In addition, in baccarat, cards are distributed to the "player" side and the "banker" side, and winnings are determined based on the cards thus distributed.

DISCLOSURE OF THE INVENTION

Problems to be Solved by the Invention

Card games such as baccarat are established in casinos, and since a dealer, for casino games, advances the game, it is necessary for the dealer to be proficient in game advancement. However, for countries in which development of casinos has only started, there has been a problem in that there is a shortage of dealers proficient in game advancement.

The present invention has an object of providing a gaming system that can allow a game to be advanced even by an inexperienced dealer, by way of navigating the dealer in game advancement.

Means for Solving the Problems

According to a first aspect of the present invention, a gaming system includes: a plurality of stations; and a control unit that performs transmission and reception of information related to a game with the plurality of stations, and carries out advancement of the game, in which the control unit has: an instructional device that carries out game operation input instructing to a dealer, an input device that accepts a game operation input from the dealer, and outputs a signal according to the game input operation thus accepted, and a controller that performs processing of:

(a) starting accepting a bet from the plurality of stations, (b) sending to the instructional device a signal for instructing to the dealer an operation input to end accepting a bet from the plurality of stations, in response to a predetermined time period elapsing since starting accepting bets from the plurality of stations, and (c) advancing a game, in a case where a signal indicating that an operation input to end accepting the bet has been received from the input device.

According to the first aspect of the present invention, an instructional device is provided that carries out game operation input instructing to the dealer, and a controller sends a signal for instructing to the dealer of an operation input for ending accepting bets to the instructional device. Accordingly, even in the case of the dealer being inexperienced, an operation of ending bet acceptance can be performed according to an instruction of the instructional device.

According to a second aspect of the present invention, a gaming system includes: a plurality of stations; and a control unit that performs transmission and reception of information related to a game with the plurality of stations, and carries out advancement of the game, in which the control unit has: a display that is disposed to be viewable by a dealer, is disposed to be unviewable by all players among a plurality of players playing a game at the plurality of stations, and displays an instructional image of a game operation input to the dealer, and an input device that accepts a game operation input from the dealer, and outputs a signal according to the game operation input thus accepted, and a controller that performs processing of:

(a) starting accepting a bet from the plurality of stations, (b) displaying on the display an instructional image for an operation input to end accepting a bet from the plurality of stations, in response to a predetermined time period elapsing since starting accepting bets from the plurality of stations, and (c) advancing a game, in a case where a signal indicating that an operation input to end accepting the bet has been received from the input device.

According to the second aspect of the present invention, the controller displays on the display an instructional image of an operation input for ending accepting of bets. Accordingly, even in the case of the dealer being inexperienced, an operation of ending bet acceptance can be carried out according to an instructional image.

Furthermore, the controller can automate game advancement for ending bet acceptance, since a game is advanced when a signal indicating that an operation for ending bet acceptance has been received.

In addition, since the display is disposed to be viewable by the dealer, and disposed to be unviewable by all the players among the plurality of players playing the game at the plurality of stations, it is possible to configure the display so as to be only viewable by the dealer.

According to a third aspect of the present invention, a gaming system includes: a plurality of stations; a control unit that performs transmission and reception of information related to a game with the plurality of stations, and carries out advancement of the game; a card reader that reads information of a card, and outputs the information; and a game portion that has a plurality of card placement areas on which the card is placed, in which the control unit has: a display that is disposed to be unviewable by all players among a plurality of players playing a game at the plurality of stations, and displays an instructional image of a game operation input to the dealer, an input device that accepts a game operation input from the dealer, and outputs a signal according to the game operation input thus accepted, and a controller that performs processing of:

(a) starting accepting a bet from the plurality of stations, (b) displaying on the display an instructional image of an operation input to end accepting a bet from the plurality of stations, in response to a predetermined time period elapsing since starting accepting bets from the plurality of stations, and (c) performing notification of a card placement area on which the card should be placed based on information received from the card reader, in a case where a signal indicating that an operation input to end accepting the bet has been received from the input device.

According to the third aspect of the present invention, the controller notifies of a card placement area on which a card should be placed based on information received from the card reader, when a signal indicating that an operation input to end accepting the bet has been received. Accordingly, even in the case of the dealer being inexperienced, a card placement region on which a card should be placed can be easily recognized according to the notification.

According to a fourth aspect of the present invention, in the gaming system as described in the third aspect, the controller performs the notification by displaying on the display a picture indicating a card placement area on which the card should be placed, in the processing of (c).

According to the fourth aspect of the present invention, even in the case of the dealer being inexperienced, a card placement area on which a card should be placed can be easily recognized according to a picture on the display.

According to a fifth aspect of the present invention, in the gaming system as described in the third aspect, a plurality of luminous bodies corresponding to each of the plurality of card placement areas is provided in the game portion, and the controller performs the notification by illuminating the luminous body, among the plurality of luminous bodies, corresponding to the card placement area on which the card should be placed.

According to the fifth aspect, even in the case of the dealer being inexperienced, a card placement area on which a card should be placed can be easily recognized according to illumination of a luminous body.

According to a sixth aspect of the present invention, a gaming system includes: a plurality of stations; a control unit that performs transmission and reception of information related to a game with the plurality of stations, and carries out advancement of the game; a card reader that reads information of a card, and outputs the information; and a game portion that has a plurality of card placement areas included in the game portion, in which the sensor outputs a detection signal in response to the card having been placed on the card placement area being detected, and the control unit has: a display that is disposed to be viewable by a dealer, is disposed to be unviewable by all players among a plurality of players playing a game at the plurality of stations, and displays an instructional image of a game operation input to the dealer, an input device that accepts a game operation input from the dealer, and outputs a signal according to the game operation input thus accepted, and a controller that performs processing of:

(a) starting accepting a bet from the plurality of stations, (b) displaying on the display an instructional image of an operation input to end accepting a bet from the plurality of stations, in response to a predetermined time period elapsing since starting accepting bets from the plurality of stations, (c) performing a first notification to notify of a card placement area on which the card should be placed based on information received from the card reader, in a case where a signal indicating that an operation input to end accepting the bet has been received from the input device, and (d) performing a second notification to notify that a card should be placed on the card placement area, in a case where the detection signal has not been received from the sensor provided to a card placement area on which the card should be placed within a predetermined time period since performing the first notification.

According to the sixth aspect of the present invention, the controller performs a second notification to notify that a card should be placed on the card placement area, in a case where the detection signal has not been received from the sensor provided to the card placement area on which the card should be placed within a predetermined time period since performing the first notification. Accordingly, even in the case of the dealer being inexperienced, the card placement area on which a card should be placed can be easily recognized according to the first notification, while if a card has not been placed on the card placement area within the predetermined time period, the fact that a card should be placed on the card placement area can be easily recognized by way of the second notification.

According to a seventh aspect of the present invention, in the gaming system as described in the sixth aspect, the controller performs the first notification by display on the display, in a first display mode, a picture indicating a card placement area on which the card should be placed, in the processing of (c), and performs the second notification by displaying on the display, in a second display mode, a picture indicating the card placement area on which the card should be placed, in the processing of (d).

According to the seventh aspect of the present invention, even in the case of the dealer being inexperienced, the card placement area on which a card should be placed can be easily recognized according to the first display mode of the display, while if a card has not been placed on the card placement area within the predetermined time period, the fact that the card should be placed on the card placement area can be easily recognized by way of the second display mode of the display.

According to an eighth aspect of the present invention, in the gaming system as described in the sixth aspect, a plurality of luminous bodies corresponding to each of the plurality of card placement areas is provided to the game portion, and the controller performs the first notification by illuminating, in a first illumination mode, a luminous body, among the plurality of luminous bodies, corresponding to a card placement area on which the card should be placed, in the processing of (c), and performs the second notification by illuminating, in a second illumination mode, a luminous body, among the plurality of luminous bodies, corresponding to the card placement area on which the card should be placed, in the processing of (d).

According to the eighth aspect of the present invention, even in the case of the dealer being inexperienced, the card placement area on which a card should be placed can be easily recognized according to the first illumination mode of a luminous body, while if the card has not been placed on the card placement area within the predetermined time period, the fact that the card should be placed on the card placement area can be easily recognized by way of the second illumination state of the luminous body.

According to a ninth aspect of the present invention, a gaming system includes: a plurality of stations; a control unit that performs transmission and reception of information related to a game with the plurality of stations, and carries out advancement of the game; a card reader that reads information of a card, and outputs the information; and a game portion that has a plurality of card placement areas on which the card is placed, in which the control unit has: a display that is disposed to be viewable by a dealer, is disposed to be unviewable by all players among a plurality of players playing a game at the plurality of stations, and displays an instructional image of a game operation input to the dealer, and an input device that accepts a game operation input from the dealer, and outputs a signal according to the game operation input thus accepted, and a controller that performs processing of:

(a) starting accepting a bet from the plurality of stations, (b) displaying on the display an instructional image of an operation input to end accepting a bet from the plurality of stations, in response to a predetermined time period elapsing since starting accepting bets from the plurality of stations, (c) performing notification of a card placement area on which the card should be placed based on information received from the card reader, in a case where a signal indicating that an operation input to end accepting the bet has been received from the input device, and (d) determining a game result based on information received from the card reader, displaying a picture of the game result thus determined on the display, and sending data of the game result thus determined to the plurality of stations.

According to the ninth aspect of the present invention, the dealer can understand the game result by viewing a picture displayed on the display, while a player can understand the game result at a station by viewing a picture displayed on a display provided in the station.

According to a tenth aspect of the present invention, a gaming system includes: a plurality of stations; a control unit that performs transmission and reception of information related to a game with the plurality of stations, and carries out advancement of the game; a card reader that reads information of a card, and outputs the information; and a game portion that has a plurality of card placement areas on which the card is placed, in which a sensor is provided to each of the plurality of card placement areas included in the game portion, the sensor outputs a detection signal in response to the card having been placed on the card placement area being detected, and the control unit has: a display that is disposed to be viewable by a dealer, is disposed to be unviewable by all players among a plurality of players playing a game at the plurality of stations, and displays an instructional image of a game operation input to the dealer, an input device that accepts a game operation input from the dealer, and outputs a signal according to the game operation input thus accepted, and a controller that performs processing of:

(a) starting accepting a bet from the plurality of stations, (b) displaying on the display an instructional image of an operation input to end accepting a bet from the plurality of stations, in response to a predetermined time period elapsing since starting accepting bets from the plurality of stations, (c) performing a first notification to notify of a card placement area on which the card should be placed based on information received from the card reader, in a case where a signal indicating an operation input to end accepting the bet has been received from the input device, (d) performing a second notification to notify that the card should be placed on the card placement area, in a case where the detection signal has not been received from the sensor provided to the card placement area on which the card should be placed within a predetermined time period since performing the first notification, and (e) determining a game result based on information received from the card reader, displaying a picture of the game result thus determined on the display, and sending data of the game result thus determined to the plurality of stations.

According to the tenth aspect of the present invention, the dealer can understand the game result by viewing a picture displayed on the display, while a player can understand the game result at a station by viewing a picture displayed on the display provided in the station.

Effects of the Invention

According to the present invention, it is possible to provide a gaming system that can allow a game to be advanced even by an inexperienced dealer, by way of navigating the dealer in game advancement.

EXPLANATION OF REFERENCE NUMERALS

Figure 1:
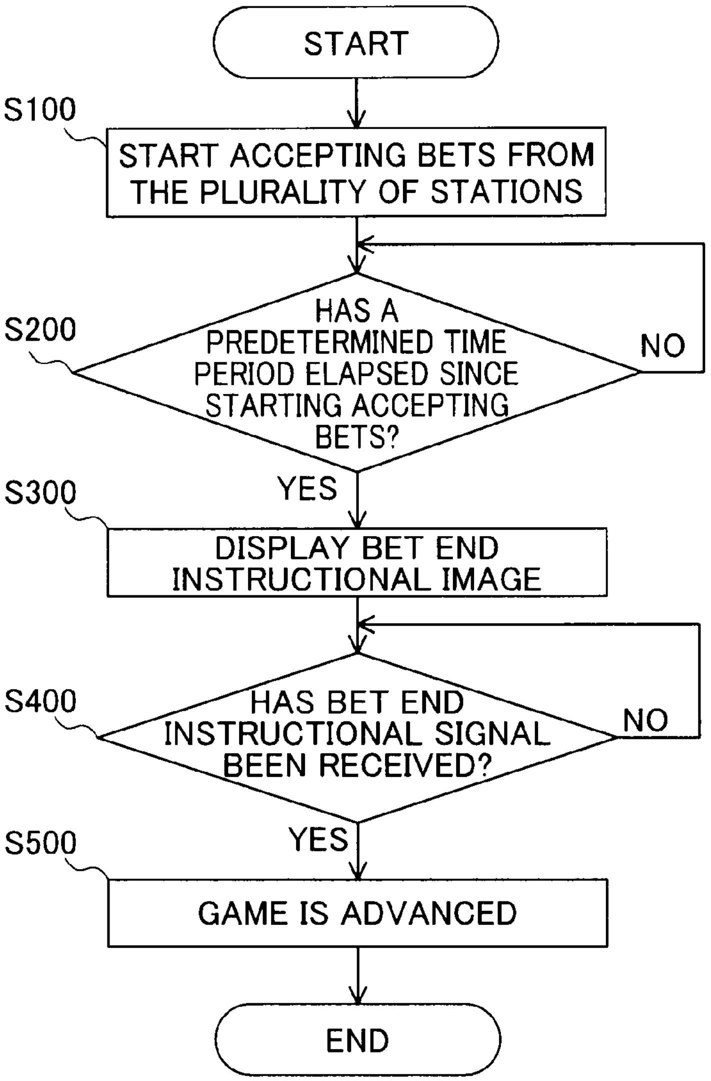
FIG. 1 is a flowchart schematically showing a process sequence of a gaming system according to an embodiment of the present invention.

1 gaming system
2 control unit
3 game portion
4 station
80 main control portion
81 CPU
82 ROM
83 RAM
210 dealer-used display
212 card reader
214 operation input button

PREFERRED MODE FOR CARRYING OUT THE INVENTION

Embodiments of the present invention are explained below with reference to the drawings.

More specifically, as described later and shown in FIG. 1, a CPU 81 starts accepting a bet from a plurality of stations 4 (Step S100), responds to a predetermined time period elapsing since starting accepting bets (Step S200), by displaying on a dealer-used display 210 an instructional image (bet end instructional image) for an operation input to end accepting a bet from the plurality of stations 4 (Step S300), and in a case where a signal (bet end instruction signal) indicating an operation input to end accepting a bet has been received from an operation input button 214 (Step S400), advances the game (Step S500).

Figure 2:
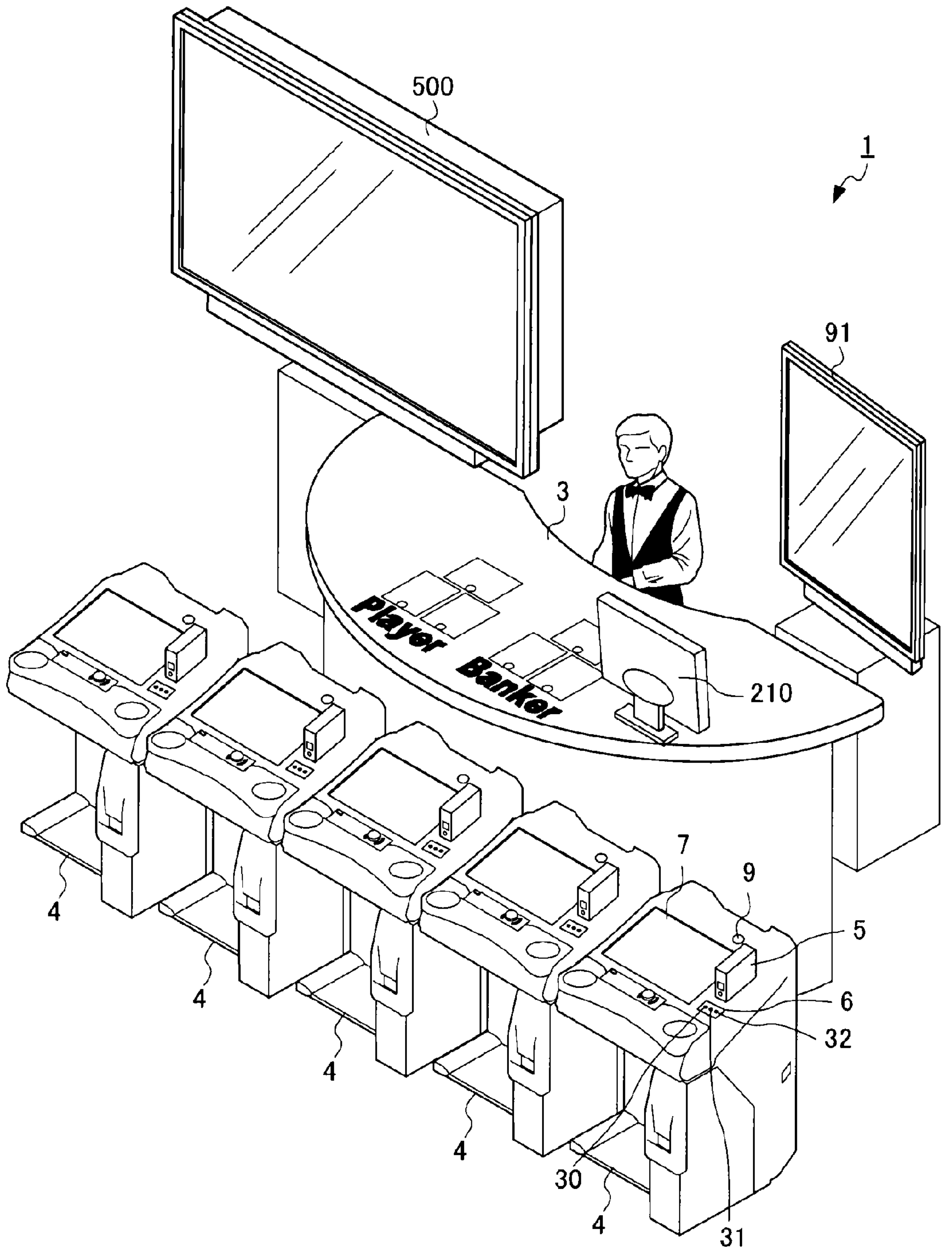
FIG. 2 is a perspective view of the gaming system according to the embodiment of the present invention.
Figure 3:
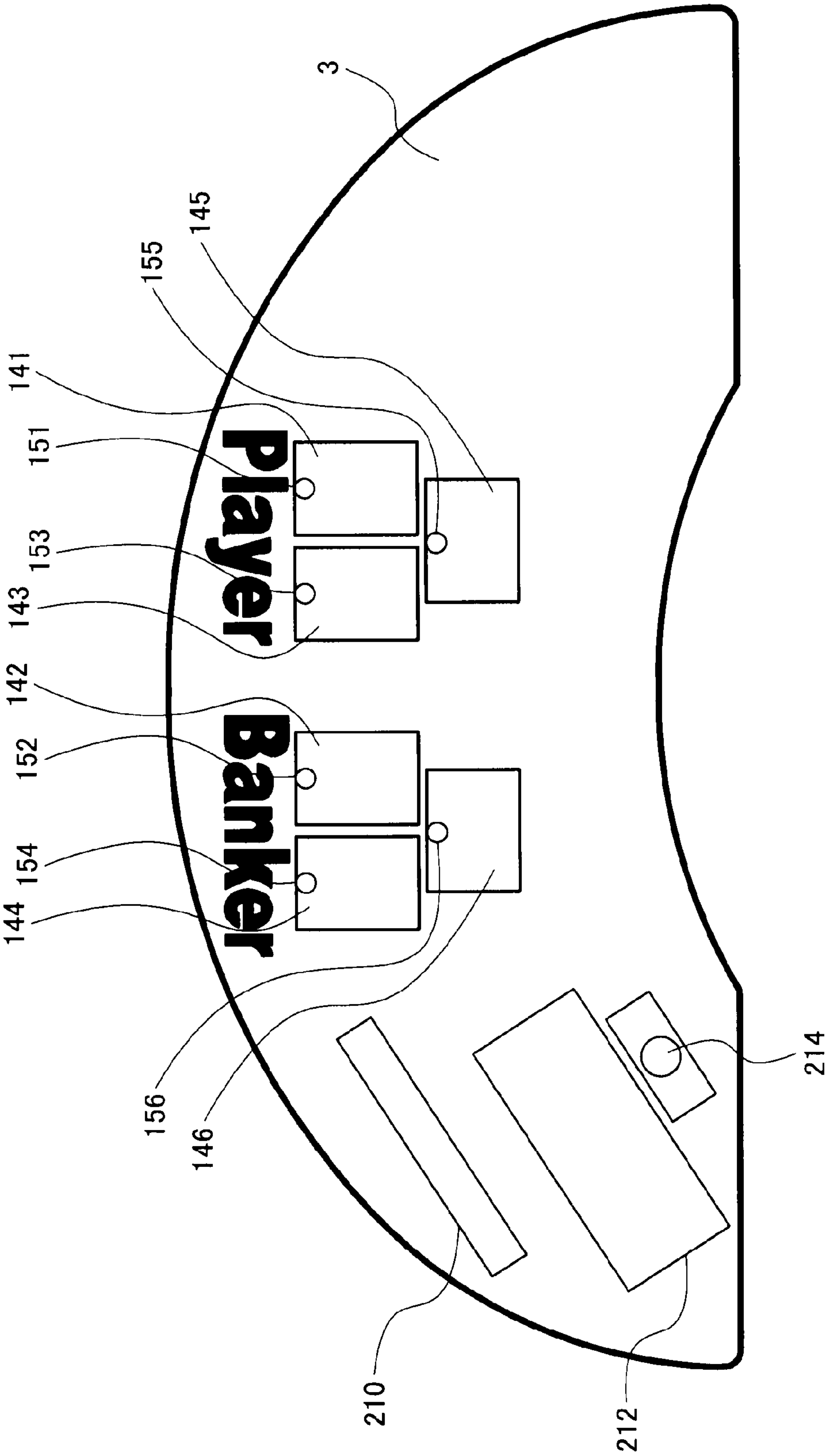
FIG. 3 is a view showing a game portion of the gaming system shown in FIG. 2 enlarged.

Referring to FIGS. 2 and 3, a gaming system 1 of the present embodiment will be explained. FIG. 2 is a perspective view typically showing an example of the gaming system 1. FIG. 3 is a view from above a game portion 3 included in the gaming system 1.

The gaming system 1 of the present embodiment is configured with a plurality of stations 4, a game portion 3, a card reader 212, and a control unit 2 (described later in FIG. 4). In addition, a history display portion 91 is provided at a position viewable by players playing the game at the plurality of stations 4. Furthermore, a large external monitor 500 is provided at a position viewable by people surrounding the plurality of stations 4.

The control unit 2 controls the entirety of the gaming system 1. In addition, the control unit 2 includes a dealer-used display 210 that the dealer uses, an operation input button 214, and a CPU 81 (described later in FIG. 4), and performs control of the entirety of the gaming system 1 according to operations by the dealer. The dealer-used display 210 is positioned to be unviewable by players seated at each of the stations 4. In addition, the body portion (not illustrated) of the control unit 2 is positioned below the game portion 3.

The stations 4 are terminals operated by players. The stations 4 accept a bet operation from a player seated at a seat (not illustrated) prepared in front of the station 4, and furthermore, performs processing of paying out game winnings. The station 4 is provided with an image display device 7. Players seated at each station 4 participate in a baccarat game by performing a BET input on any of a "Player (player position)", "Banker (banker position), and "Tie (draw)".

The station 4 is provided with a game media receiving device 5 into which game media such as medals used in a game is inserted, a control portion 6 composed of a plurality of control buttons to which predetermined instructions are input by a player and the like, and an image display device 7 on which images related to a baccarat game and the like are displayed. Then, the player can participate in a game while looking at an image displayed on the image display device 7 by operating the control portion 6 and the like.

Furthermore, at the top right of the image display device 7 of each station 4, a speaker 9 is provided that is capable of outputting sound.

The control portion 6 is provided at a side of the image display device 7 of the station 4. A select button 30, cash out button 31, and help button 32 are disposed on the control portion 6.

The select button 30 is a button that is pressed, after performing a BET operation, when selecting the BET operation. In addition, even in cases other than a BET operation, it is a button that is pressed when selecting an input performed by the player.

The cash out button 31 is a button usually pressed after a game ends, and when the cash out button 31 is pressed, game media is refunded from a payout opening according to the credits owned by the player.

The help button 32 is a button pressed in a case where operation methods of the game and the like are unclear, and when the help button 32 is pressed, a help screen showing a variety of operational information is displayed immediately thereafter on the image display device 7.

The game portion 3 includes card placement areas 144 to 146 on which cards used in a baccarat game are placed, lamps 151 to 156, and IC tag readers 161 to 166 (described later in FIG. 4). The lamps 151 to 156 are provided for navigating the dealer on the card placement area on which a card should be placed, and the lamps 151 to 156 respectively correspond to the card placement areas 141 to 146. For example, when the lamp 151 is illuminated, the dealer can understand that the card should be placed on the card placement area 141. It should be noted that the lamps 151 to 156 are each configured with LED luminous bodies. The IC tag readers 161 to 166 are provided for detecting whether a card has been placed on a card placement area, and the IC tag readers 161 to 166 respectively correspond to the card placement areas 141 to 146. For example, when a card is placed on the card placement area 141, the IC tag reader 161 outputs a detection signal indicating that a card having been placed on the card placement area 141 has been detected. IC tags detectable by the IC tag readers 161 to 166 are embedded in the cards used in the baccarat game of the present embodiment.

Here, a method of reading information stored in the IC tags with the IC tag readers 161 to 166 is explained.

The IC tag readers 161 to 166 are noncontact IC tag readers, and are capable of reading information stored in an IC tag by way of an RFID (Radio Frequency Identification) system, for example. RFID system refers to a system that performs short-range communication in order to read and write data stored in semiconductor memory contactlessly by way of induction fields or electric waves. It should be noted that this technology is conventionally known technology, and an explanation thereof has been omitted due to having been described in Japanese Unexamined Patent Application Publication No. H08-21875.

In addition, reading of the IC tag is not limited to noncontact, and may be contact. Moreover, it is not limited to an IC tag reader, and may be such that is suitably installed in accordance with a reading feature.

Furthermore, a dealer-used display 210, an operation input button 214, and a card reader 212 are disposed on the game portion 3.

The card reader 212 is installed to read information (suit such as spades, and value) of cards used in a baccarat game. A sensor (not illustrated) for reading information of a card is provided in the card reader 212, and this sensor outputs information of a card thus read. This sensor, for example, may be the IC tag reader described above, or a camera. In the case of reading with an IC tag reader, card information is stored in the IC tag embedded in a card.

The history display portion 91 is a display on which game history such as which side among a player side and banker side won in each game up to that previous. Details thereof are described later.

An external large monitor 500 is a display on which live-pictures such as game advancement, demo screens, and the like are displayed. Details thereof are described later.

Game advancement is described later with reference to the flowcharts of FIGS. 6 to 10, FIGS. 11 to 20, FIG. 22, and FIG. 23.

Figure 4:
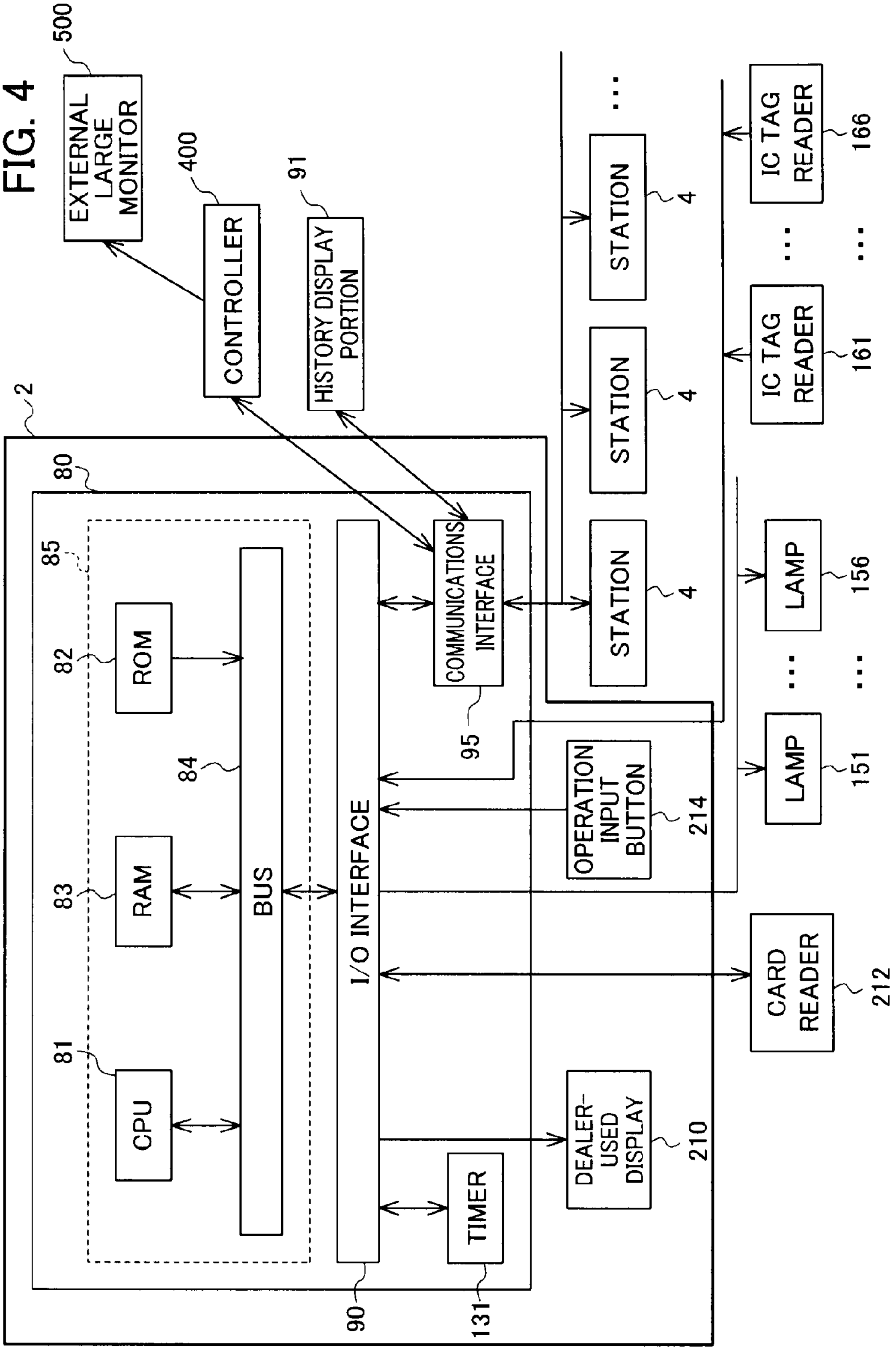
FIG. 4 is a block diagram showing an internal configuration of a control unit.

FIG. 4 is a block diagram showing an internal configuration of a control unit.

A main control portion 80 of the control unit 2 has a microcomputer 85 that is mainly configured with a CPU 81, ROM 82, RAM 83, and a bus 84 that carries out data transmission between each of these.

The CPU 81 is connected to the dealer-used display 210, card reader 212, and operation input button 214 via an I/O interface 90.

The CPU 81 sends picture data of various screens, which are described later in FIGS. 12, 14, 16, 18, 20, and 23, to the dealer-used display 210. The CPU 81 receives from the card reader 212 information of a card (suit, value, etc.) read by the card reader 212. The CPU 81 receives a bet end instruction signal, which is described later, from the operation input button.

In addition, the CPU 81 is connected via the I/O interface 90 to a timer 131 capable of measuring time. Moreover, the CPU 81 is connected via the I/O interface 90 to the lamps 151 to 156. The lamps 151 to 156 emit light of each color when navigating the dealer of a card placement area based on an output signal from the CPU 81.

In addition, the IC tag readers 161 to 166 are connected to the I/O interface 90, and the CPU 81 receives from the IC tag readers 161 to 166 a detection signal indicating that cards have been placed on the card placement areas 141 to 146.

Furthermore, a communications interface 95 is connected to the I/O interface 90, and a main control portion 80 performs transmission and reception of data such as BET information and dividend information between each station 4 via this communications interface 95.

Additionally, the history display portion 91 is connected to the communications interface 95, and the main control portion 80 performs transmission and reception of data of game history with the history display portion 91.

Moreover, the large external monitor 500 is connected to the communications interface 95 via the controller 400, and the main control portion 80 performs transmission and reception of image data and the like with the large external monitor 500.

Live pictures of game advancement and the like, demo screens, and the like are displayed on this large external monitor 500. In this way, it is possible to attract the interest of people around the large external monitor 500.

The ROM 82 in the main control portion 80 stores a program for implementing basic features of the control unit 2, and more specifically a program for controlling various devices provided in the game portion 3 and a program for controlling each station 4, as well as holding winnings tables, data indicating a predetermined time T, data indicating a specific value TT, and the like.

The RAM 83 is memory that temporarily stores various data computed by the CPU 81, and temporarily stores BET information sent from each station 4, information of cards sent from the card reader 212, detection signals of cards sent from the IC tag readers 161 to 166, data related to the results of processing executed by the CPU 81, and the like, for example.

The CPU 81 controls various devices provided to the game portion 3 and executes control processing along with game advancement, based on data and programs stored in the ROM 82 and RAM 83.

In addition to control processing along with game advancement, the CPU 81 performs transmission and reception of data with each station 4, and has functions for controlling each station 4 to advance a game. More specifically, BET information sent from each station 4 is received. Furthermore, dividend amounts to be paid out at each station 4 are calculated based on a game result ("Player (player position) winning, "Banker (banker position) winning, or "Tie (draw)") and BET information sent from each station 4 by referring to a dividend table stored in the ROM 82.

Figure 5:
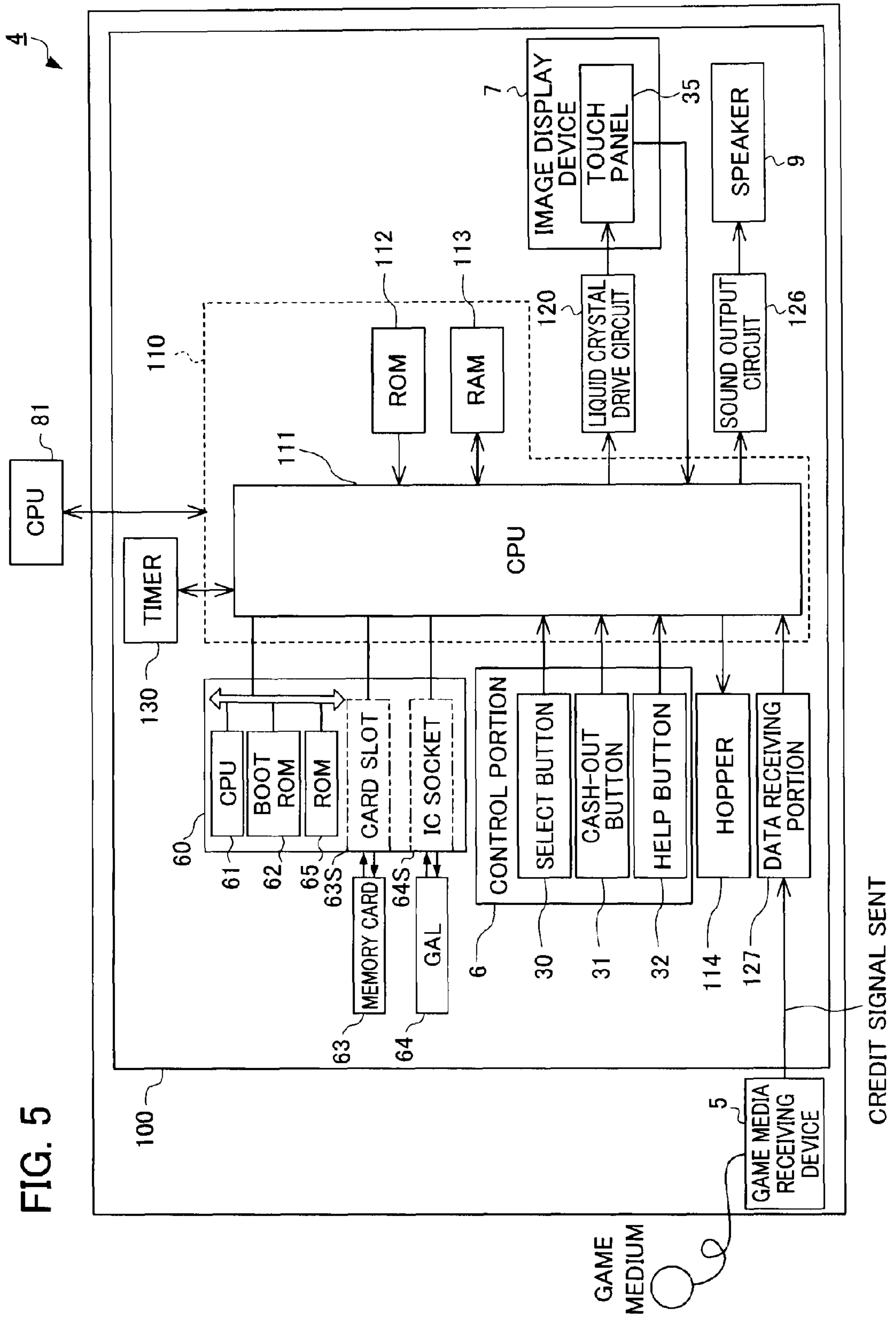
FIG. 5 is a block diagram showing an internal configuration of a station shown in FIG. 2.

FIG. 5 is a block diagram showing an internal configuration of the station shown in FIG. 2.

The station 4 is provided with a body portion 100 in which the image display device 7 is provided, and a game media receiving device 5 installed in the body portion 100. Furthermore, the body portion 100 is provided with a station control portion 110 and a few pieces of peripheral equipment.

The station control portion 110 is provided with a CPU 111, ROM 112, and RAM 113.

The ROM 112 stores programs for implementing basic functions of the station 4, various programs necessary for control of the station 4, data tables, and the like.

The select button 30, cash out button 31, and help button 32 provided in the control portion 6 are each connected to the CPU 111. Then, the CPU 111 controls the various corresponding operations that should be executed according to the operation signal output by pressing each button and the like. More specifically, various processing is executed based on an input signal supplied from the control portion 6 in response to an operation of a player having been input, as well as data and programs stored in the ROM 112 and RAM 113, and the result thereof is sent to the CPU 81 of the main control portion 80.

Furthermore, the CPU 111 receives command signals from the CPU 81 of the main control portion 80, and controls peripheral devices configuring the station 4. In addition, the CPU 111 executes various processing based on input signals supplied from the control portion 6 and touch panel 35, as well as data and programs stored in the ROM 112 and RAM 113. Then, the peripheral devices configuring the station 4 are controlled based on the results of the processing. It should be noted that, in regards to by which method processing is performed, it is set for each processing depending on the contents of this processing. For example, game media payout processing corresponds to the former, and BET operation processing by a player corresponds to the latter.

A hopper 114 is connected to the CPU 111, and the hopper 114 pays out a predetermined number of game media from the payout opening according to a command signal from the CPU 111.

The image display device 7 is connected to the CPU 11 via a liquid crystal drive circuit 120. The liquid crystal drive circuit 120 is configured with program ROM, image ROM, an image control CPU, work RAM, a VDP (video display processor), video RAM, and the like. Programs for image control related to display on the image display device 7, and various selection tables are stored in the program ROM. Dot data for forming images to be displayed by the image display device 7, for example, are stored in the image ROM. In addition, the image control CPU performs determination of an image to be displayed on the image display device 7 from among dot data stored beforehand in the image ROM, based on parameters set by the CPU 111, according to the image control program stored beforehand in the program ROM. In addition, the work RAM is configured as a temporary storage means for when the image control program is executed by the image control CPU. Moreover, the VDP forms an image according to display contents determined by the image control CPU, and performs output thereof to the image display device 7. It should be noted that the video RAM is configured as a temporary storage means for when an image is formed by the VDP.

Furthermore, a sound output circuit 126 and speaker 9 are connected to the CPU 111, and the speaker 9 generates various sound effects when performing various renderings based on output signals from the sound output circuit 126. In addition, a game media receiving device 5, which is a device that receives money and game media such as medals, is connected to the CPU 111 via a data receiving portion 127. The data receiving portion 127 receives a credit signal sent from the game media receiving device 5, and the CPU 111 adds a number of credits of a player stored in the RAM 113 based on the credit signal thus sent.

The timer 131, which is capable of measuring time, is connected to the CPU 111.

A gaming board 60 is provided with a CPU (Central Processing Unit) 61, ROM 65 and boot ROM 62, a card slot 63S compliant with a memory card 63, and an IC socket 64S compliant with GAL (Generic Array Logic) 64, which are mutually connected by an internal bus.

The memory card 63 consists of non-volatile memory such as compact flash (registered trademark), and stores a game program and a game system program.

In addition, the card slot 63S is configured so that the memory card 63 can be inserted thereinto, and is connected to the CPU 111 by an IDE bus. Therefore, it is also possible to change the type of game performed by the station 4 and contents by pulling the memory card 63 out from the card slot 63S, writing a different game program and game system program onto the memory card 63, and inserting this memory card 63 into the card slot 63S. In addition, it is possible to change the type of game performed by the station 4 and contents by replacing the memory card 63 on which one game program and game system program are stored with a memory card 63 on which a different game program and game system program are stored. A program related to game advancement and the like are included in the game program. In addition, image data, sound data and the like output during a game are included in the game program.

The GAL 64 is a type of PLD having an OR fixed array structure. The GAL 64 is provided with a plurality of input ports and output ports, and when predetermined data is input to an input port, data corresponding to this data is output from an output port. In addition, the IC socket 64S is configured so that the GAL 64 is detachable, and is connected to the CPU 111 by a PCI bus.

The CPU 61, ROM 65 and boot ROM 62, which are mutually connected by an internal bus, are connected to the CPU 111 by the PCI bus. The PCI bus performs signal transfer between the CPU 111 and the gaming board 60, and carries out electric power supply from the CPU 111 to the gaming board 60. Country identifying information and an authentication program are stored in the ROM 65. A preliminary authentication program, program (boot code) for the CPU 61 to start the preliminary authentication program, and the like are stored in the boot ROM 62.

The authentication program is a program (tamper checking program) for authenticating the game program and game system program. The authentication program is written in accordance with a sequence (authentication sequence) in which confirmation and verification that the game program and game system program, which are the targets of authentication processing, have not been tampered are performed, i.e. authentication of the game program and game system program. The preliminary authentication program is a program for authenticating the authentication program described above. The preliminary authentication program is written in accordance with a sequence (authentication sequence) in which verification that the authentication program, which is the target of authentication processing, has not been tampered is performed, i.e. authentication of the authentication program.

Next, processing executed in the main control portion of a game device according to the present embodiment is explained with reference to FIGS. 6 to 10.

Figure 6:
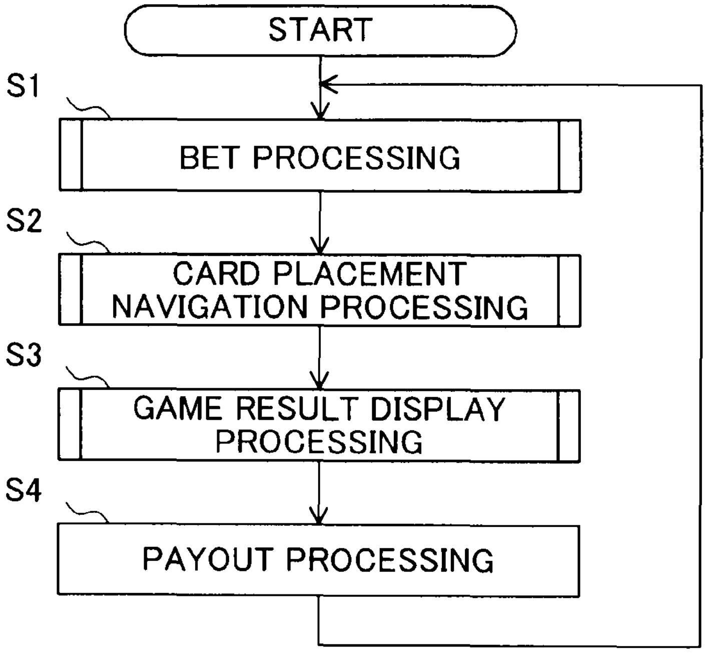
FIG. 6 is a flowchart of baccarat game execution processing.

FIG. 6 is a flowchart showing baccarat game execution processing.

First, in Step S1, the CPU 81 executes bet processing, which is described later in FIG. 7, and in Step S2, the CPU 81 executes card placement navigation processing, which is described later in FIG. 8. In Step S3, the CPU 81 executes game result display processing, which is described later in FIG. 9, and in Step S4, executes payout processing in response to game results ("Player (player position) winning, "Banker (banker position) winning, or "Tie (draw)") and BET information sent from each station 4, and then returns to Step S1.

Figure 7:
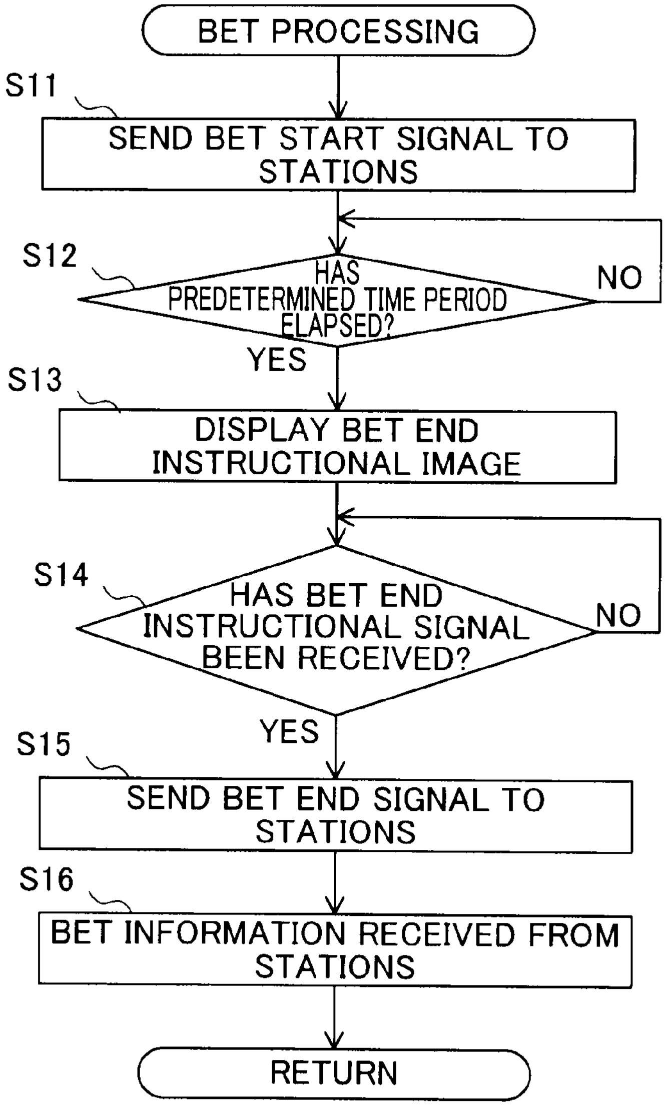
FIG. 7 is a flowchart of bet processing.

FIG. 7 is a flowchart showing bet processing.

In Step S11, the CPU 81 sends a bet start signal to each station 4. When a bet start signal has been received, betting is made possible at each station 4.

Here, appearances during betting are explained with reference to FIGS. 11 and 12.

Figure 11:
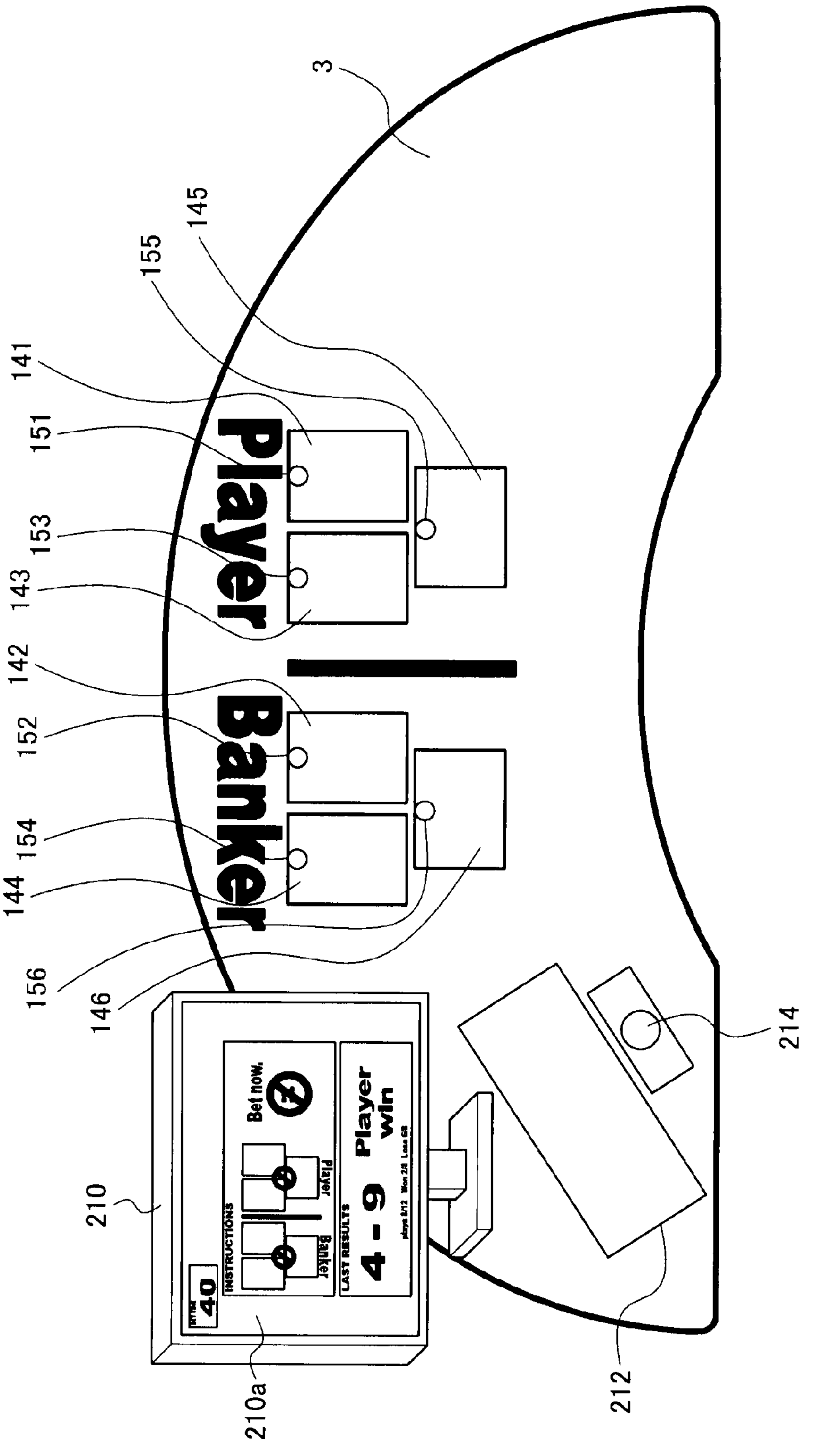
FIG. 11 is a view showing an appearance of the game portion.

FIG. 11 is a view showing an appearance of the game portion 3 during betting. According to FIG. 11, a card has not been placed on any of the card placement areas 141 to 146. The in-bet image shown in FIG. 12 is displayed on a display screen 210*a* of the dealer-used display 210.

Figure 12:
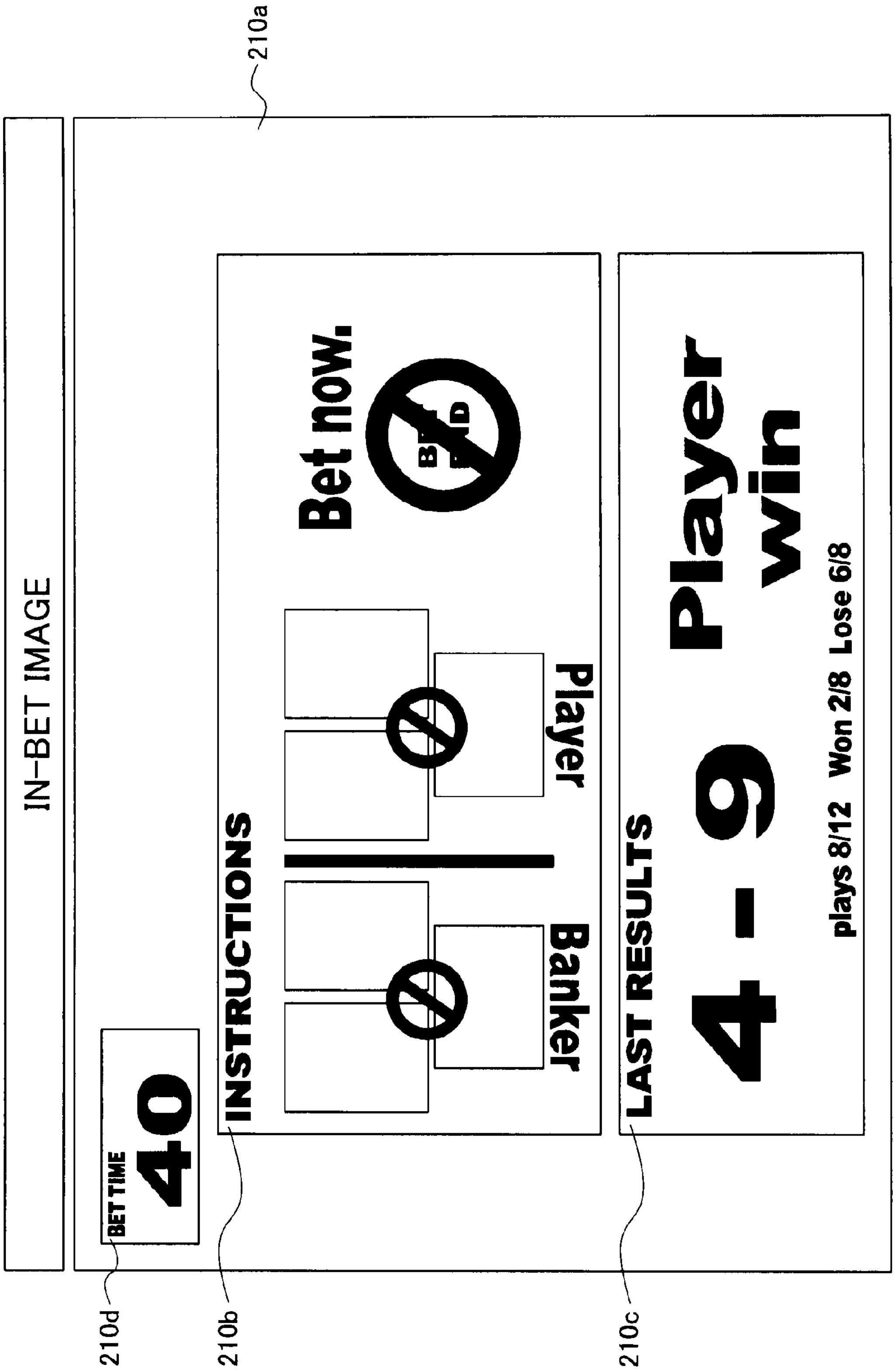
FIG. 12 is a view showing a display example of a dealer-used display.

FIG. 12 is a view showing the in-bet image, and the image, which is during betting and is for navigating the dealer that the "BET END" button (operation input button 214) must not be pressed, is displayed in a display area 210*b*. An image showing the results of the previous game is displayed in a display area 210*c*. The time in which a bet is possible is displayed in a display area 210*d*.

In Step S12, the CPU 81 determines whether a predetermined time period has elapsed. More specifically, the CPU 81 starts measuring an elapsed time t with the timer 131, compares the elapsed time t with data indicating a predetermined time period T1 (e.g., 5 seconds) stored in the ROM 82, and determines whether the elapsed time t measured by the timer 131 has become the predetermined time period T1. In a case of this determination being NO, the CPU 81 returns the processing to Step S12, and in the case of being YES, advances the processing to Step S13.

In Step S13, the CPU 81 displays a bet end instructional image (refer to FIG. 14) on the display screen 210*a* of the dealer-used display 210.

Here, an appearance during betting is explained with reference to FIGS. 13 and 14.

Figure 13:
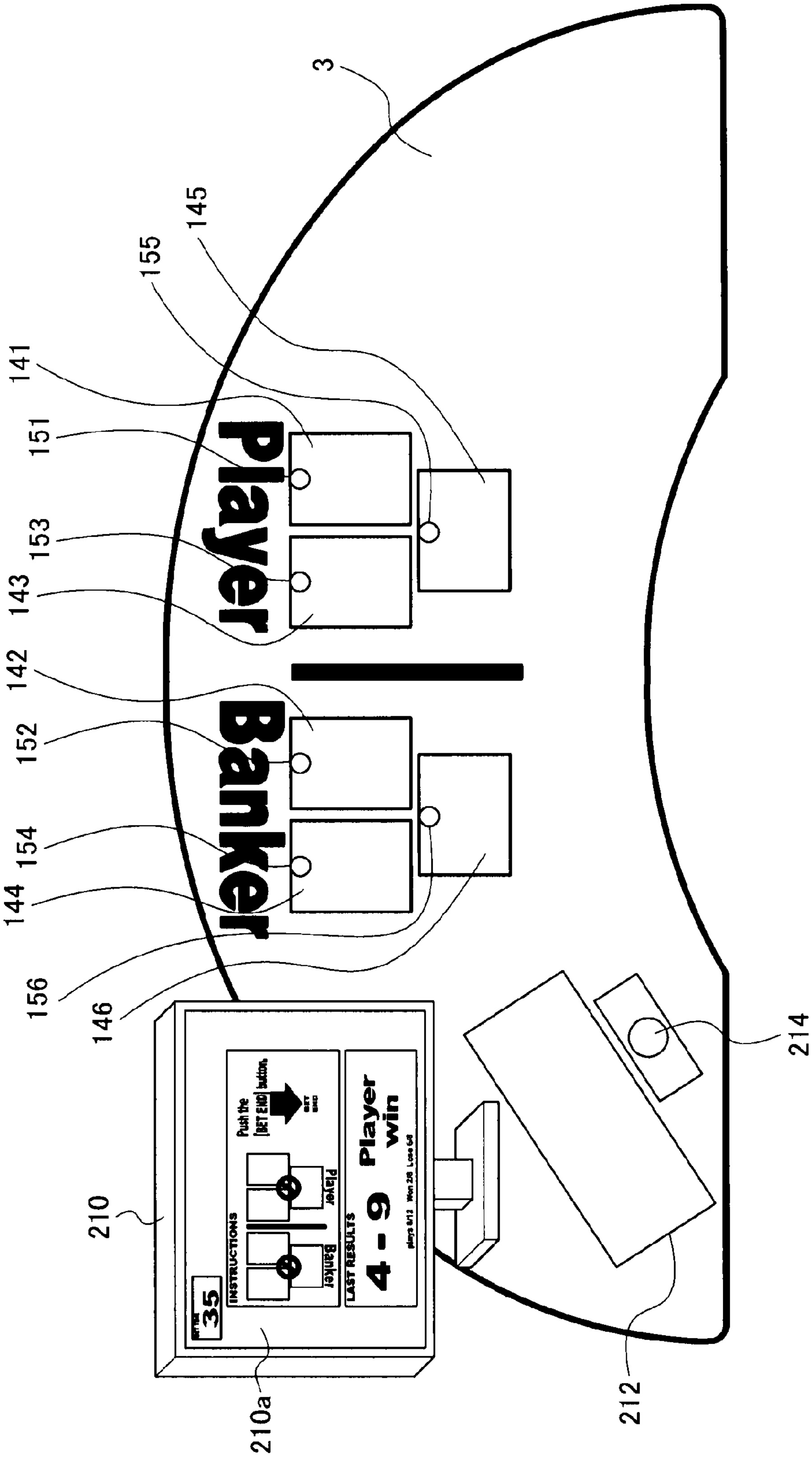
FIG. 13 is a view showing an appearance of the game portion.

FIG. 13 is a view showing an appearance of the game portion 3 five seconds after the start of betting. According to FIG. 13, a card has not been placed on any of the card placement areas 141 to 146. The bet end instructional image, shown in FIG. 14, is displayed on the display screen 210*a* of the dealer-used display 210.

Figure 14:
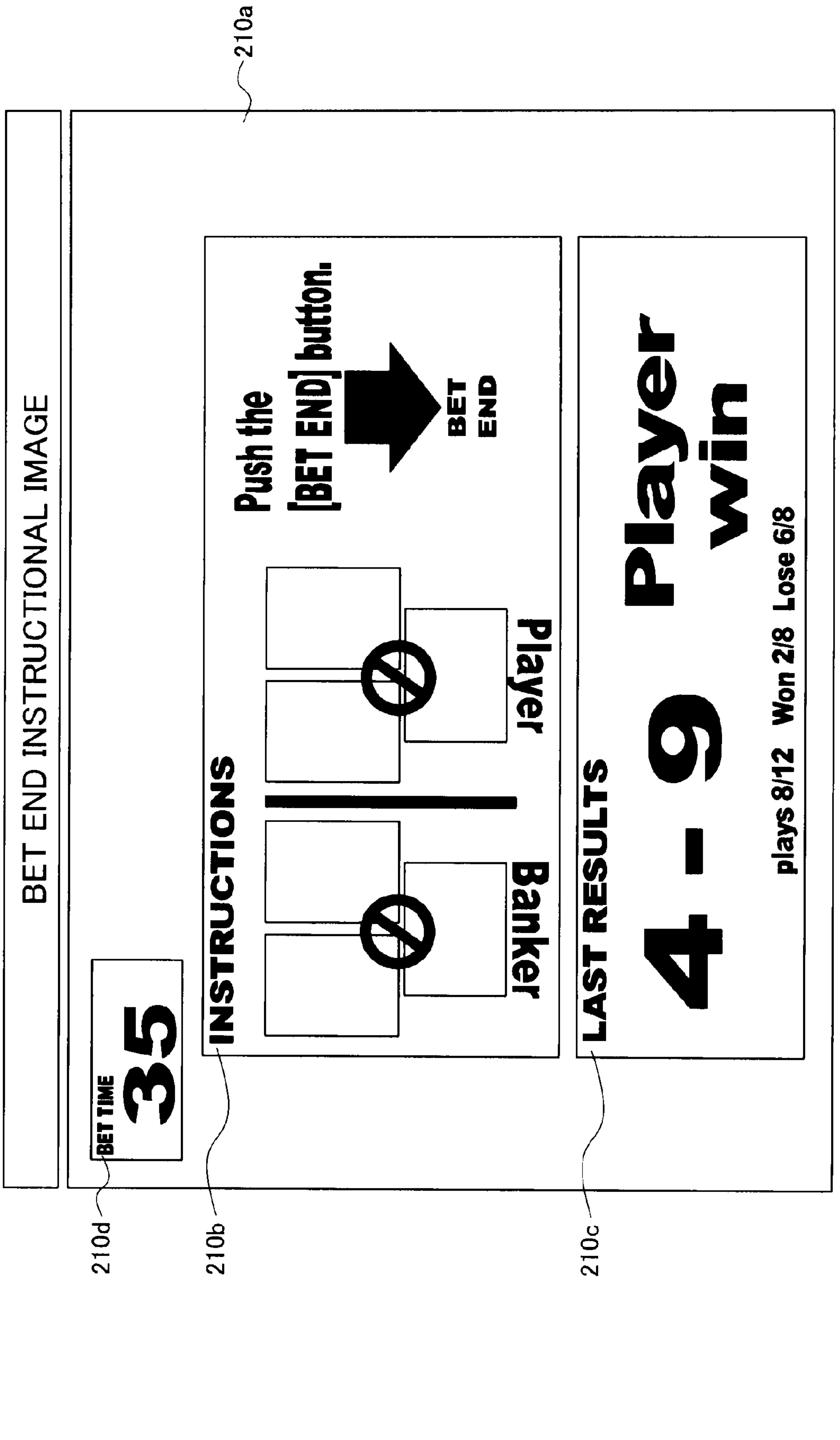
FIG. 14 is a view showing a display example of the dealer-used display.

FIG. 14 is a view showing the bet end instructional image, and the image for navigating the dealer that the "BET END" button (operation input button 214) should be pressed is displayed in the display area 210*b*. An image showing the results of the previous game is displayed in the display area 210*c*. A time in which betting is possible is displayed in the display area 210*d*.

In Step S14, the CPU 81 determines whether a bet end instruction signal has been received from the operation input button 214. In the case of this determination being NO, the CPU 81 returns the processing to Step S14, and in the case of being YES, advances the processing to Step S15.

In Step S15, the CPU 81 sends a bet end signal to each station 4. When the bet end signal has been received at each station 4, betting becomes impossible, and the CPU 111 in the station control portion 110 displays an image (not illustrated) informing that acceptance of bets has ended on the image display device 7.

In Step S16, the CPU 81 receives BET information from each station 4. BET information is information related to a BET input performed at each station 4. In addition, information indicating whether a bet stored in a bet presence determination table (not illustrated) has been performed is also included in the BET information. When the processing of Step S16 ends, the CPU 81 ends bet processing.

Even if the dealer is inexperienced, an end operation for bet acceptance can be performed according to an instructional image by way of the bet processing of the present invention.

Figure 8:
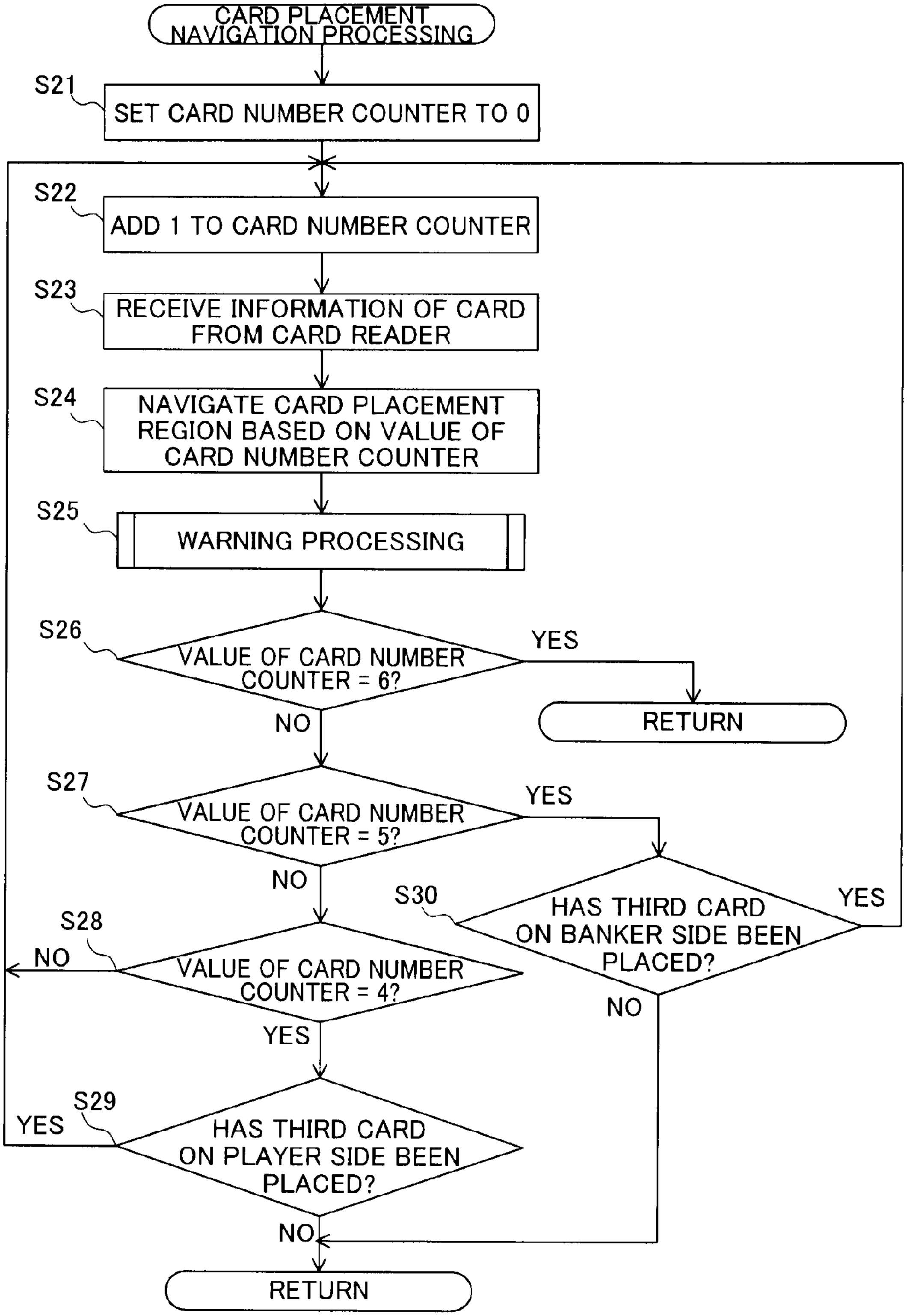
FIG. 8 is a flowchart of card placement navigation processing.

FIG. 8 is a flowchart showing card placement navigation processing.

In Step S21, the CPU 81 sets a card number counter to 0. This card number counter is a counter for counting a number of cards that the card reader 212 has read, and is established in a predetermined memory area of the RAM 83.

Here, a relationship between the number of cards and the card placement areas 141 to 146 is explained.

A first card is placed on the card placement area 141 of the player side. A second card is placed on the card placement area 142 of the banker side. A third card is placed on the card placement area 143 of the player side. A fourth card is placed on the card placement area 144 of the banker side. A fifth card is placed on the card placement area 145 of the player side. A sixth card is placed on the card placement area 146 of the banker side.

In Step S22, the CPU 81 adds 1 to the card number counter.

In Step S23, the CPU 81 receives information of a card from the card reader 212. More specifically, the CPU 81 receives information (suit, value) of a card from a sensor (not illustrated) provided to the card reader 212. The information of the card thus received is associated with a value of the card number counter, and is stored in the predetermined memory area of the RAM 83. By configuring in this way, information of the card read in the card reader 212 and the value of a sequence in which the card was read in the card reader 212 are associated.

For example, in a case of the first card being a six of diamonds (the card, which is a card read in the card reader 212 first, is placed on the card placement area 141), data of "1, diamonds, 6" is stored in a predetermined memory area of the RAM 83. Similarly, data of "2, hearts, 3", "3, hearts, K", "4, spades, 9", "5, diamonds, A", and "6, hearts, 8" are stored.

In Step S24, the CPU 81 navigates a card placement area based on a value of the card number counter.

Here, an aspect of navigating the placement area of a first card is explained with reference to FIGS. 15 and 16.

Figure 15:
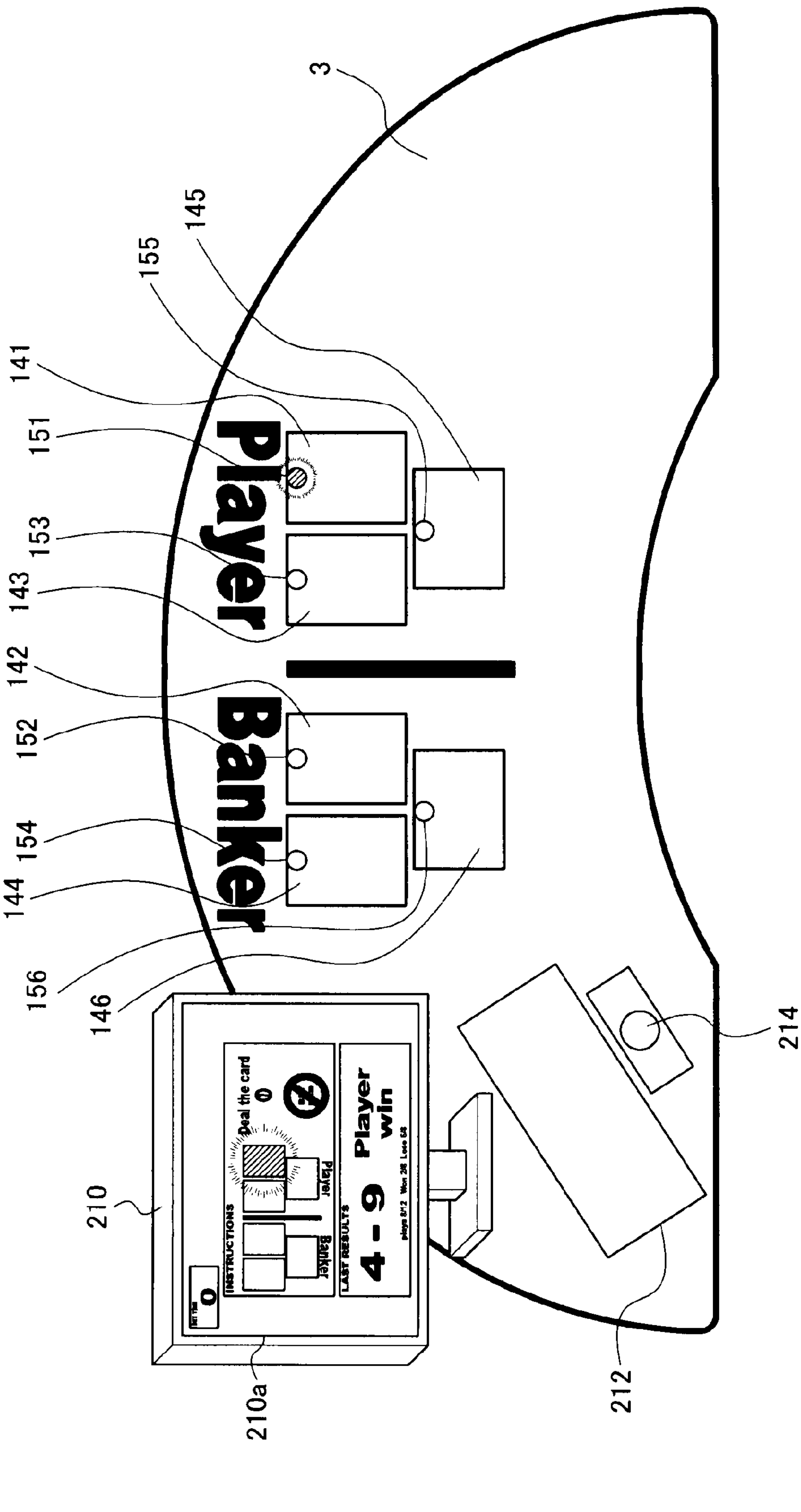
FIG. 15 is a view showing an appearance of the game portion.

FIG. 15 is a view showing an appearance of the game portion 3 while navigation of a placement area of a first card is being performed when the value of the card number counter is 1. According to FIG. 15, the lamp 151 provided at the card placement area 141 is illuminated in green. A first placement instructional image shown in FIG. 16 is displayed on the display screen 210*a* of the dealer-used display 210.

In this way, the dealer can recognize that a card should be placed on the card placement area 141.

Figure 16:
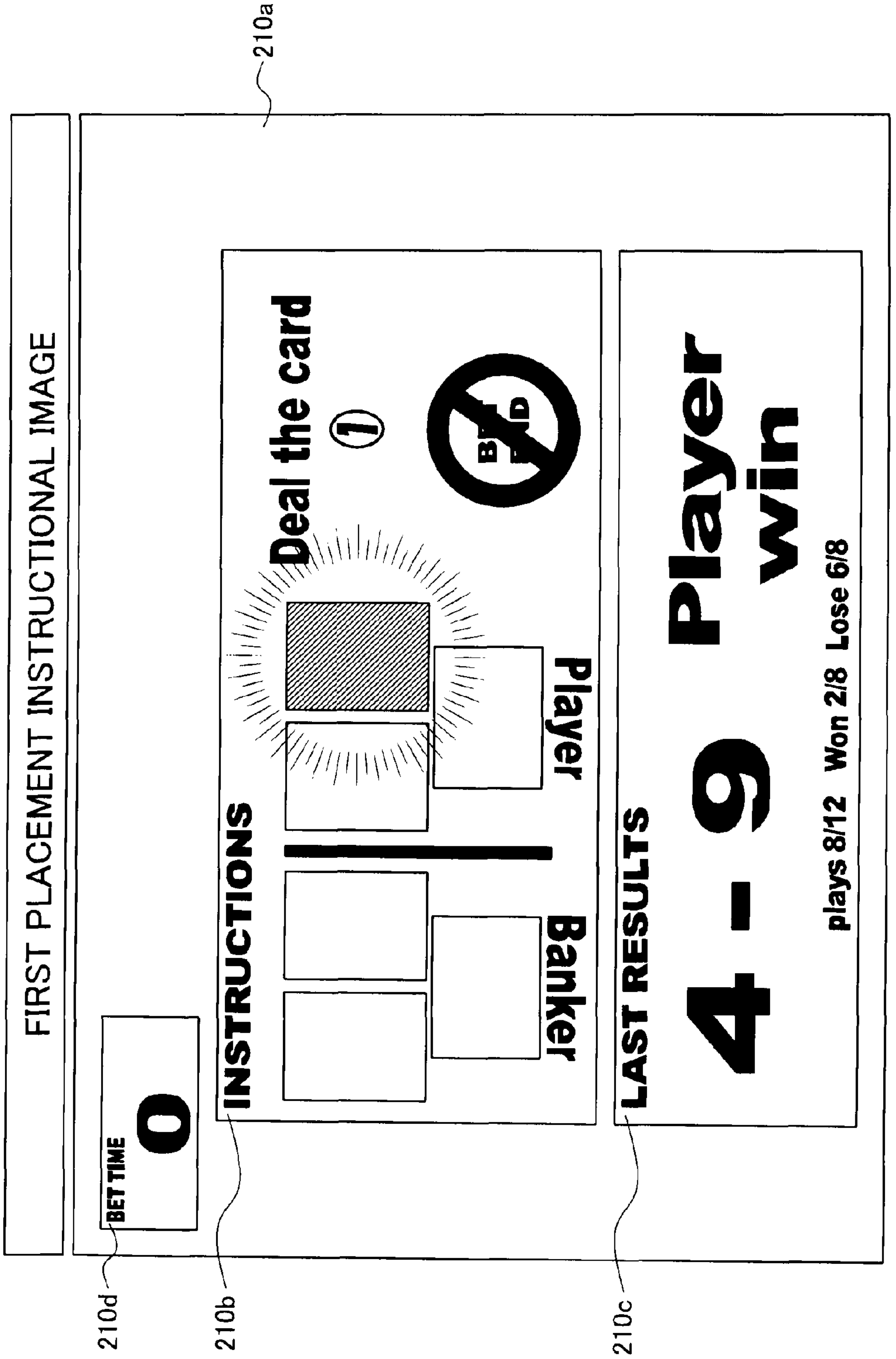
FIG. 16 is a view showing a display example of the dealer-used display.

FIG. 16 is a view showing a first placement instructional image, and the image for navigating the dealer that the first card should be placed on the card placement area 141 is displayed in the display area 210*b*. According to this figure, the location corresponding to the card placement area 141 is shown to be illuminated in green. An image showing the results of the previous game is displayed in the display area 210*c*. The facts that the time in which betting is possible is 0, and that the betting period has ended are shown in the display area 210*d*.

In this way, the dealer can recognize that a card should be placed on the card placement area 141 also by looking at the display area 210*b*.

Furthermore, an aspect of navigating the placement area of a second card is explained with reference to FIGS. 17 and 18.

Figure 17:
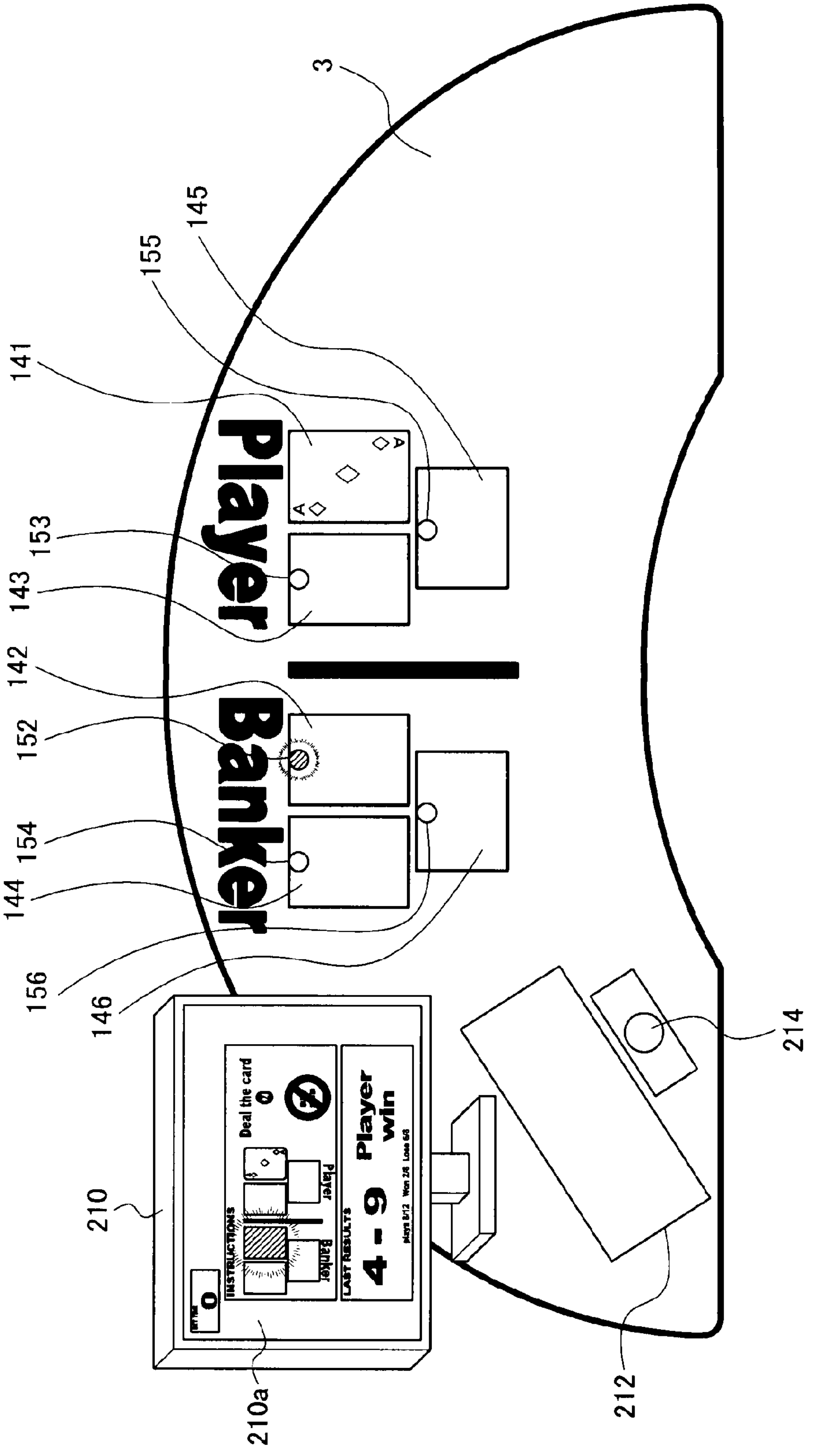
FIG. 17 is a view showing an appearance of the game portion.

FIG. 17 is a view showing an appearance of the game portion 3 while navigation of a placement area of the second card is being performed when the value of the card number counter is 2. According to FIG. 17, the first card is placed on the card placement area 141, and the lamp 152 provided at the card placement area 142 is illuminated in green. The second placement instructional image shown in FIG. 18 is displayed on the display screen 210*a* of the dealer-used display 210.

In this way, the dealer can recognize that the card should be placed on the card placement area 142.

Figure 18:
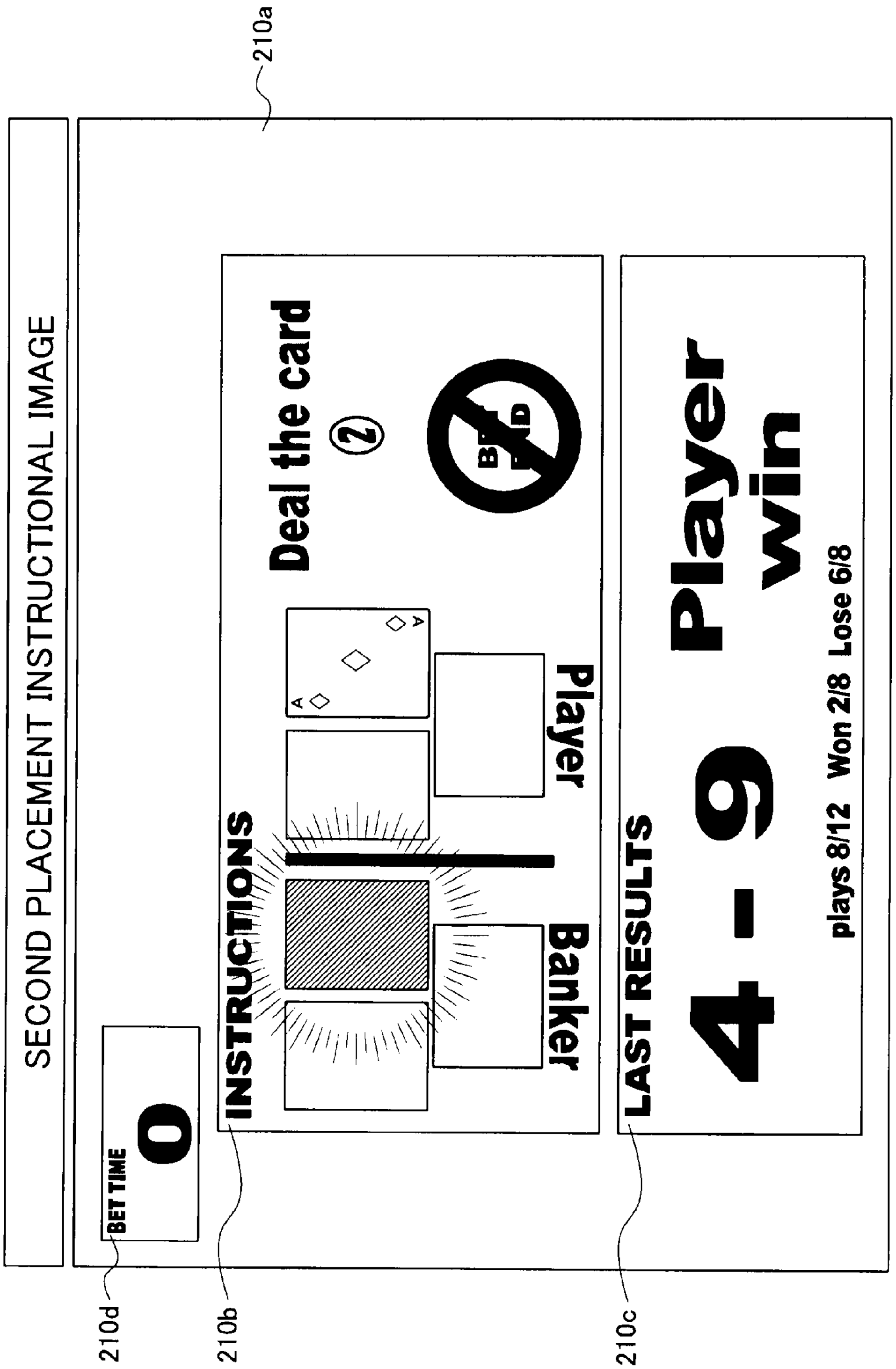
FIG. 18 is a view showing a display example of the dealer-used display.

FIG. 18 is a view showing a second placement instructional image, and the image for navigating the dealer that the second card should be placed on the card placement area 142 is displayed in the display area 210*b*. According to this figure, a location corresponding to the card placement area 142 is shown to be illuminated in green. An image showing the results of the previous game is displayed in the display area 210*c*. The facts that the time in which betting is possible is 0, and that the betting period has ended are shown in the display area 210*d*.

In this way, the dealer can recognize that the card should be placed on the card placement area 142 also by looking at the display area 210*b*.

It should be noted that the method of navigating a placement area of the third to sixth cards is similar to the method shown in FIGS. 15 to 18.

In Step S25 of FIG. 8, the CPU 81 performs warning processing. This warning processing is described later with reference to FIG. 10.

In Step S26, the CPU 81 determines whether the value of the card number counter is six. In the case of this determination being YES, the CPU 81 ends card placement navigation processing, and in the case of being NO, advances the processing to Step S27.

In Step S27, it is determined whether the value of the card number counter is five. In the case of this determination being YES, the CPU 81 advances the processing to Step S30, and in the case of being NO, advances the processing to Step S28.

In Step S28, it is determined whether the value of the card number counter is four. In the case of this determination being YES, the CPU 81 advances the processing to Step S29, and in the case of being NO, advances the processing to Step S22.

In Step S29, the CPU 81 determines whether a third card of the player side has been placed. In the case of this determination being YES, the CPU 81 advances the processing to Step S22, and in the case of being NO, ends card placement navigation processing. More specifically, the CPU 81 determines whether the third card of the player side has been placed based on information of the first to fourth cards (first of the player side, first of the banker side, second of the player side, and second of the banker side), stored in a predetermined memory area of the RAM 83.

In Step S30, the CPU 81 determines whether the third card of the banker side has been placed. In the case of this determination being YES, the CPU 81 advances the processing to Step S22, and in the case of being NO, ends card placement navigation processing. More specifically, the CPU 81 determines whether the third card of the player side has been placed based on information of the first to fifth cards (first of the player side, first of the banker side, second of the player side, second of the banker side, third of the player side), stored in a predetermined memory area of the RAM 83.

Figure 9:
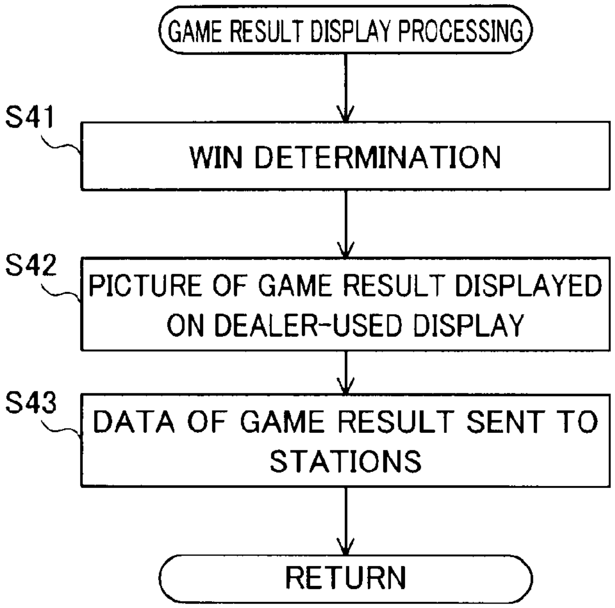
FIG. 9 is a flowchart of game result display processing.

FIG. 9 is a flowchart showing game result display processing.

In Step S41, the CPU 81 performs win determination. More specifically, the CPU 81 determines a win based on information of cards placed on the player side and the banker side.

The result of win determination (game result) is any of "Player (player position" win, "Banker (banker position)" win, or "Tie (draw)".

In Step S42, the CPU 81 displays a picture of the game result on the dealer-used display. More specifically, the CPU 81 displays a picture of the game result shown in FIG. 20 on the dealer-used display 210.

Here, an aspect at a point when a baccarat game win has been determined is explained with reference to FIGS. 19 and 20.

Figure 19:
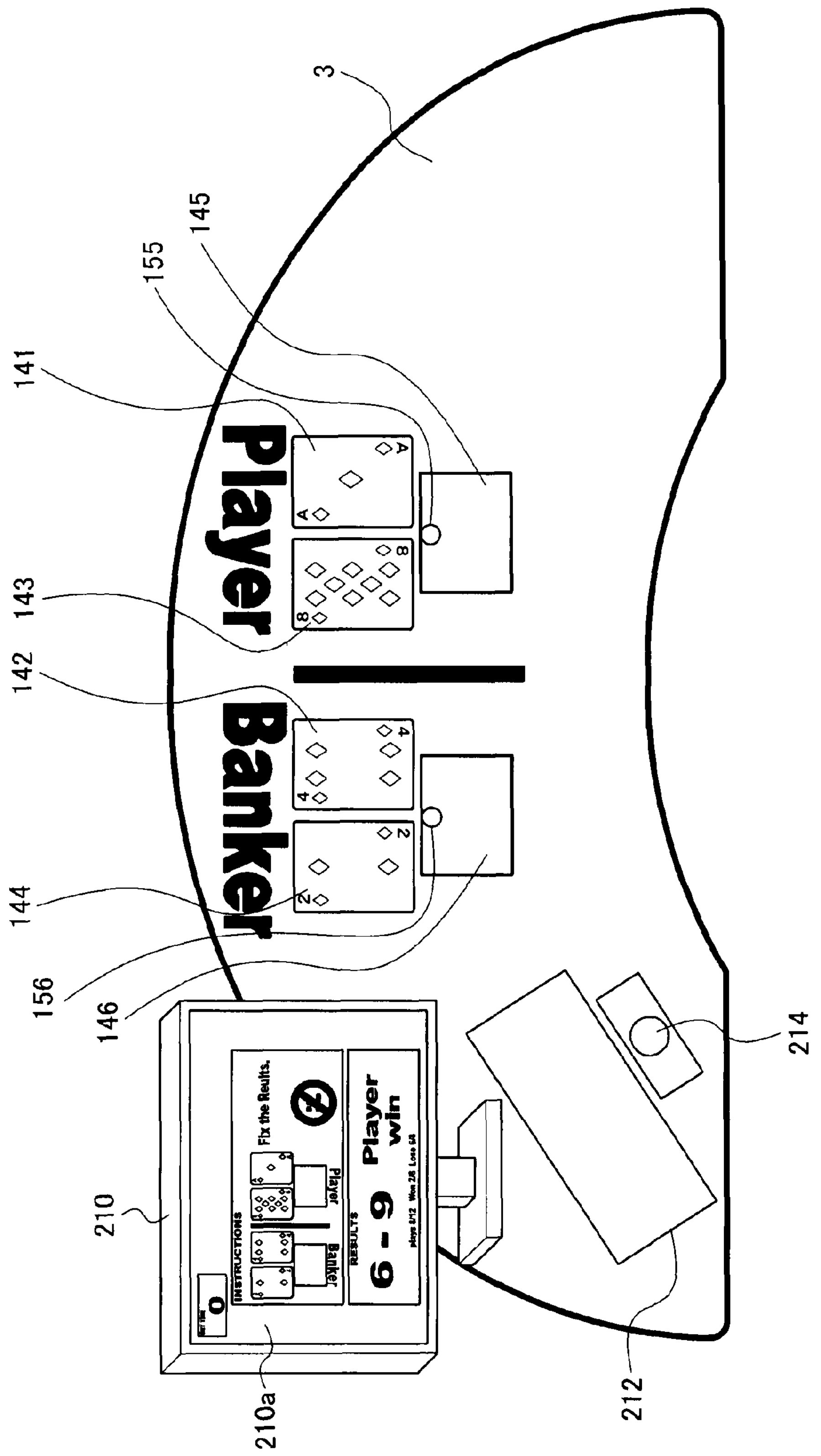
FIG. 19 is a view showing an appearance of the game portion.

FIG. 19 is a view showing an appearance of the game portion 3 at a point when the card placement navigation processing shown in FIG. 8 has ended, and a baccarat game win has been determined in Step S41 of FIG. 9. According to FIG. 19, four cards are respectively placed on the card placement areas 141 to 144. The game result image shown in FIG. 20 is displayed on the display screen 210*a* of the dealer-used display 210.

Figure 20:
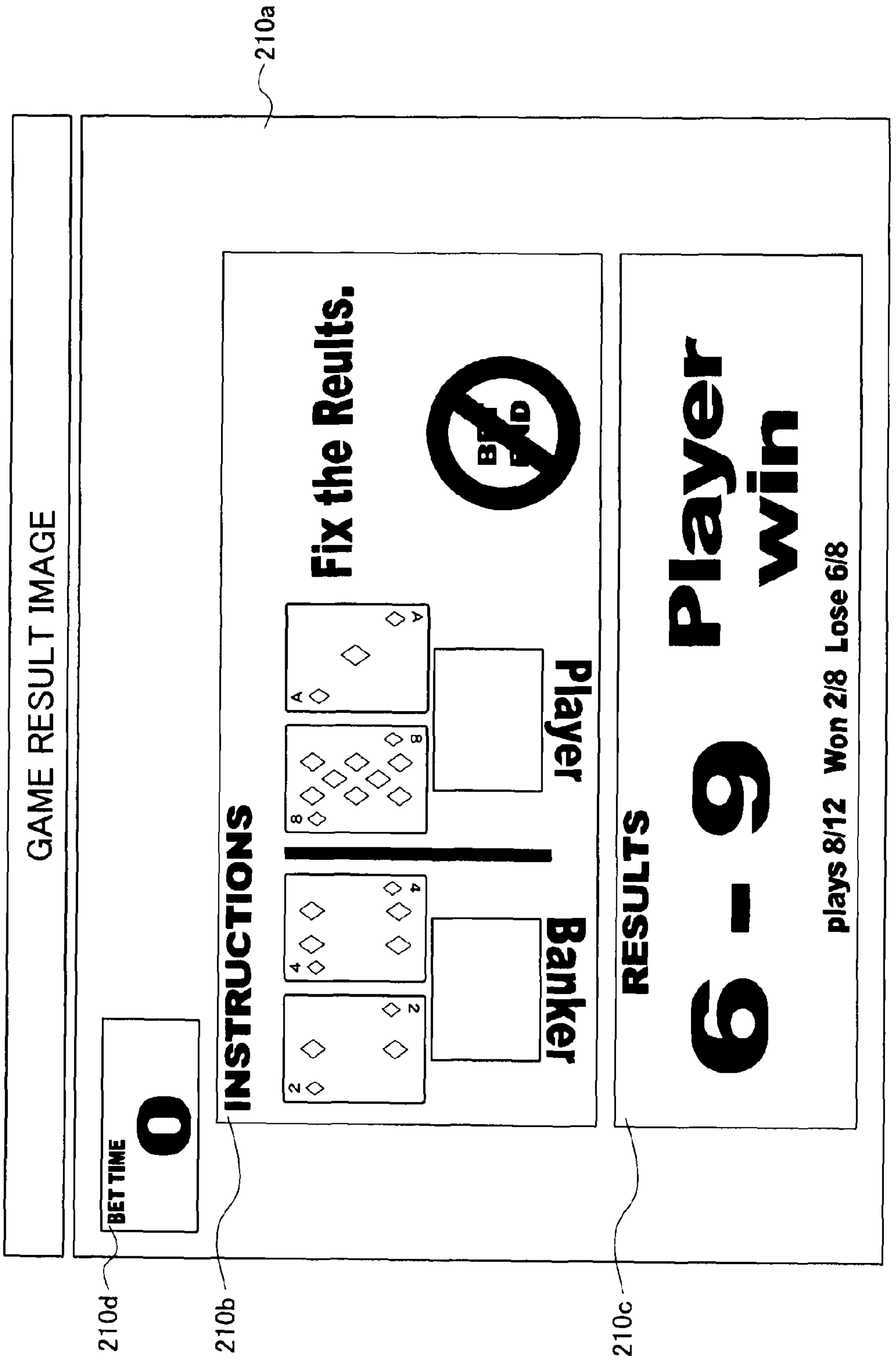
FIG. 20 is a view showing a display example of the dealer-used display.

FIG. 20 is a view showing a game result image, and the image for navigating the dealer that the "BET END" button "operation input button 214) should not be pressed since the game results have been settled is displayed in the display area 210*b*. An image showing the results of a current game is displayed in the display area 210*c*. The facts that the time in which betting is possible is 0, and that the betting period has ended are shown in the display area 210*d*.

In Step S43 of FIG. 9, the CPU 81 sends data of the game result to the plurality of stations. More specifically, the CPU 81 sends data of the game result (e.g., data indicating the player side wins by 6 to 9) to each of the stations 4. Furthermore, on the stations 4 having received data of this game result, the CPU 111 in the station control portion 110 displays a picture of the game result via the liquid crystal drive circuit 120 on the image display device 7, based on the data of this game result. Moreover, the CPU 111 performs payout based on a bet amount. These allow for a picture of the game result to be displayed on each station 4 while payout is being performed based on a bet amount. When the processing of Step S43 has ended, the CPU 81 ends the game result display processing.

Figure 21:
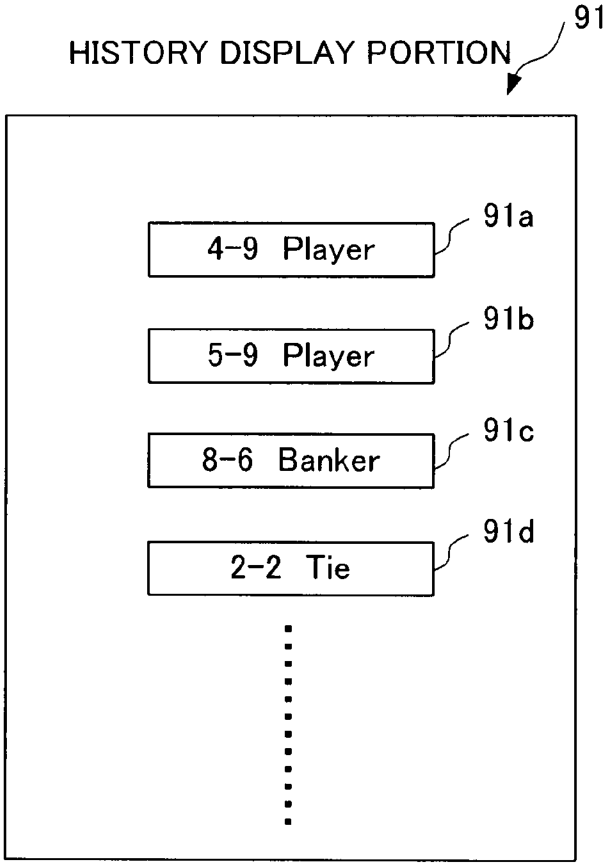
FIG. 21 is a view showing a display example of a display screen of a history display portion.

FIG. 21 is a view showing an example of an image displayed on the display screen of a history display portion.

Display areas 91*a*, 91*b*, 91*c*, 91*d* . . . for displaying game history are established on the display screen of the history display 91. The game result of a game one prior to the current game is displayed in the display area 91*a*. The game result of games two prior, three prior, four prior . . . to the current game are displayed in the display areas 91*b*, 91*c*, 91*d* . . . , respectively.

The player side having won by 4 to 9 is shown as the display contents of the display area 91*a*. The player side having won by 5 to 9 is shown as the display contents of the display area 91*b*. The banker side having won by 8 to 6 is shown as the display contents of the display area 91*c*. There being a tie of 2 to 2 is shown as the display contents of the display area 91*d*.

It should be noted that a plurality of LED luminous bodies (not illustrated) are disposed around the history display portion 91, and this plurality of LED luminous bodies emit light in various lighting states according to game advancement and the like.

Figure 10:
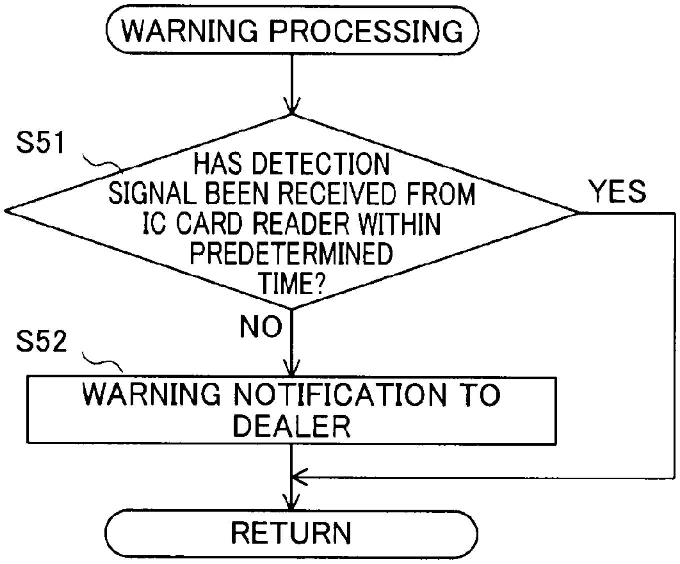
FIG. 10 is a flowchart of warning processing.

FIG. 10 is a flowchart showing warning processing.

In Step S51, the CPU 81 determines whether a detection signal has been received from the IC tag reader within a predetermined time period. More specifically, for example, in a case of the value of the card number counter being 1, it is determined that a detection signal from the IC tag reader 161 corresponding to the card placement area 141 has been received within the predetermined time period. In a case of the value of the card number counter being in 2 to 6, it is determined that detection signals from the IC tag readers 161 to 166, respectively corresponding to the card placement areas 142 to 146, have been received within the predetermined time period. In the case of this determination being YES, the CPU 81 ends warning processing, and in the case of being NO, advances the processing to Step S52.

In Step S52, the CPU 81 performs warning notification to the dealer. More specifically, in a case of the value of the card number counter being 1, for example, the CPU 81 illuminates the lamp 151 corresponding to the card placement area 151 in red. In this way, even in a case where the first card has not been placed on the card placement area 141 within the predetermined time period, by changing from green and illuminating the lamp in red, the dealer can understand that a card must be placed on the card placement area 141. In a case of the value of the card number counter being 2 to 6, one of the lamps 152 to 156 is illuminated in red. It should be noted that it is not limited to being illuminated in red, and may be configured so as to blink in red.

Here, an aspect of performing warning notification of a placement area of the first card is explained with reference to FIGS. 22 and 23.

Figure 22:
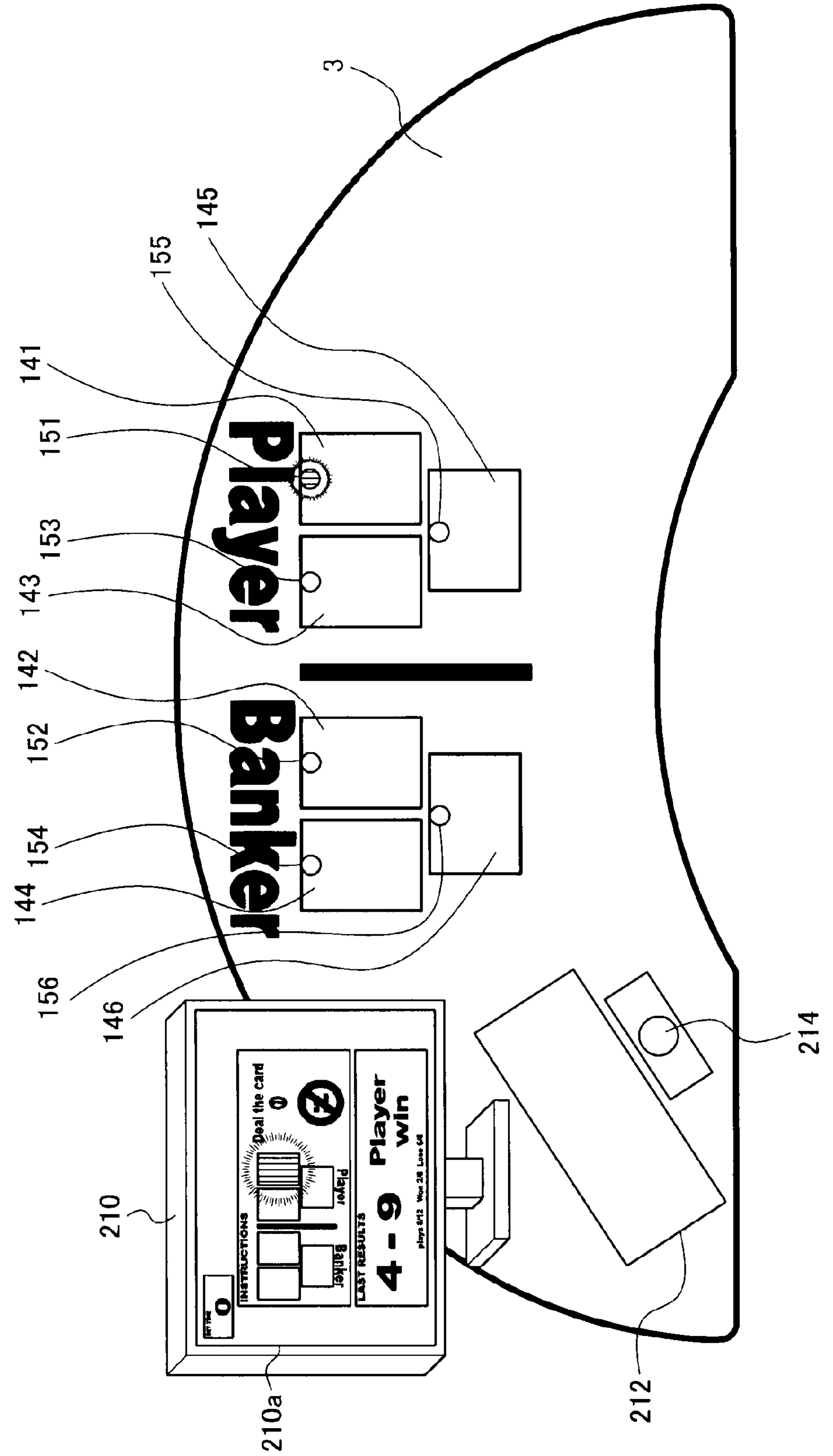
FIG. 22 is a view showing an appearance of the game portion.

FIG. 22 is a view showing an appearance of the game portion 3 while warning notification of a placement area of the first card is being performed when the value of the card number counter is 1. According to FIG. 22, the lamp 151 provided at the card placement area 141 is illuminated in red. The first placement warning notification image shown in FIG. 23 is displayed on the display screen 210*a* of the dealer-used display 210.

Figure 23:
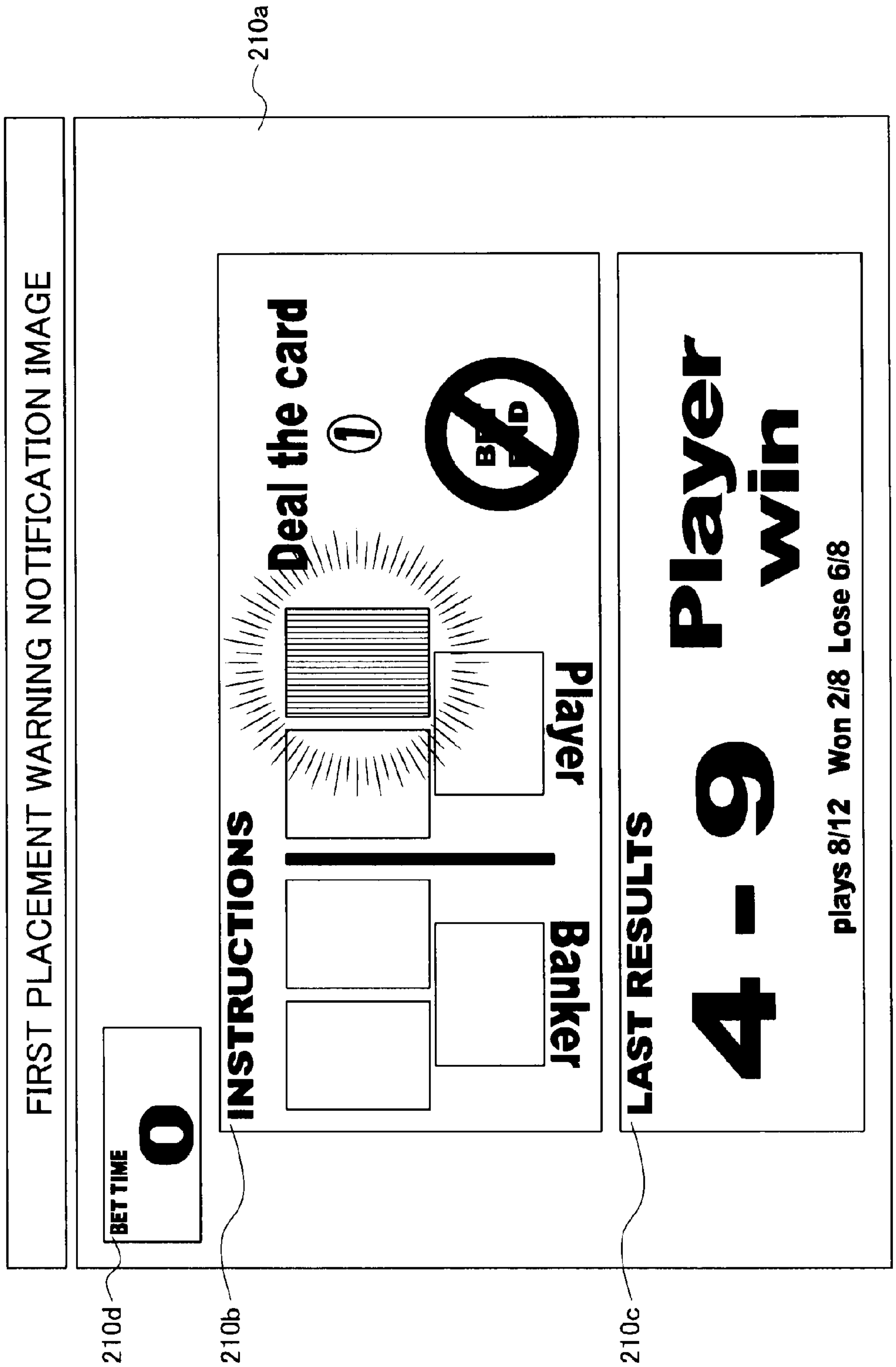
FIG. 23 is a view showing a display example of the dealer-used display.

FIG. 23 is a view showing the first placement warning notification image, and the image for performing warning notification to the dealer that the first card should be placed on the card placement area 141 is displayed on the display area 210*b*. According to this figure, the location corresponding to the card placement area 141 is shown to be illuminated in red. An image showing the result of a previous game is displayed on the display area 210*c*. The facts that the time in which betting is possible is 0, and that the betting period has ended are shown in the display area 210*d*.

The CPU 81 ends warning processing when the processing of Step S52 of FIG. 10 has ended.

An explanation of the present embodiment has been provided above. Although an explanation has been provided for the case of a baccarat game, the present invention is not limited thereto, and may be a card game such as poker or black jack, and may be a game other than a card game, for example, a dice game such as SICBO, or a roulette game.

In the present embodiment, although an instruction was made to a dealer so that an operation input button 214 is operated by displaying a bet end instructional image on the display screen 210*a* of the dealer-used display 210, it is not limited thereto, and a lamp may be provided at a location visible to the dealer (e.g., on the game portion 3 or the like) as an instructional device and instruction may be performed by illumination of the lamp, an LED luminous body may be provided in an operation input button 214 as an instructional device and instructions may be performed by illumination of the LED luminous body, or a device may be provided on the operation input button 214 as an instructional device that causes a physical change to occur in the button (e.g., raises the button).

In particular, in SICBO or roulette, it is not necessary to output at instruction for the placement location of a card to the dealer, and game advancement is possible with only an operation input button; therefore, installation of a display can be omitted.

The present embodiment is configured so that live pictures are displayed on the large external monitor 500; however, it is not limited thereto, and it may be configured so as to display on each station 4. In this way, even in a case where a player cannot easily see the game portion 3 due to the positional relationship of the station 4 and the game portion 3, the player can look at the live picture on the station 4.

In the present embodiment, a case is explained in which the controller of the present invention is configured with a CPU 81 provided to the main control portion 80 and the CPU 111 provided to the station 4; however, the controller of the present invention may be configured with only one CPU.

Although an embodiment of the present invention has been explained above, it is merely exemplified as a specific example, and the present invention is not particularly limited thereto; specific configurations of each means and the like can be suitably modified in design. In addition, the effects described in the embodiment of the present invention are merely listed as the most preferred effects arising from the present invention, and the effects according to the present invention are not limited to those described in the embodiment of the present invention.

The invention claimed is:

1. A gaming system comprising:

a plurality of stations, each including a game media receiving device configured to receive game media to be added to the station as credits, an award payout mechanism by which game media can be paid out to a player of a corresponding station or credited to current credits of the player as a result of a game, and a cash out button configured to refund game media according to the current credits of the player;

a game portion including a plurality of card placement areas on which cards are placed and a plurality of illumination devices which correspond to the plurality of card placement areas, respectively; and a control unit that performs transmission and reception of information related to the game with the plurality of stations, and carries out advancement of the game, wherein the control unit includes:

an instructional device that carries out game operation input instructing to a dealer, an input device that accepts a game operation input from the dealer, and outputs a signal according to the game input operation thus accepted, and a controller that performs processing of:

(a) starting accepting a bet from the plurality of stations, (b) sending to the instructional device a signal for instructing to the dealer an operation input to end accepting a bet from the plurality of stations, in response to a first predetermined time period elapsing since starting accepting bets from the plurality of stations, wherein the processing (b) includes starting measuring an elapsed time with a timer since starting accepting bets, comparing the elapsed time with data indicating the first predetermined time period, and determining that the first predetermined time period has elapsed when the elapsed time becomes the first predetermined time period, and (c) advancing a game, in a case where a signal indicating that an operation input to end accepting the bet has been received from the input device, wherein (c) advancing the game includes:

displaying on the instructional device an image indicating a target card placement area on which the dealer should place a card from among the plurality of card placement areas at a time when the dealer attempts to place a card on any one of the plurality of card placement areas; and illuminating an illumination device corresponding to the target card placement area among the plurality of illumination devices when the card is not placed on the target card placement area within a second predetermined time period.

2. A gaming system comprising:

a plurality of stations, each including a game media receiving device configured to receive game media to be added to the station as credits, an award payout mechanism by which game media can be paid out to a player of a corresponding station or credited to current credits of the player as a result of a game, and a cash out button configured to refund game media according to the current credits of the player;

a game portion including a plurality of card placement areas on which cards are placed and a plurality of illumination devices which correspond to the plurality of card placement areas, respectively; and a control unit that performs transmission and reception of information related to the game with the plurality of stations, and carries out advancement of the game, wherein the control unit includes:

a display that is disposed to be viewable by a dealer, is disposed to be unviewable by all players among a plurality of players playing a game at the plurality of stations, and displays an instructional image of a game operation input to the dealer, an input device that accepts a game operation input from the dealer, and outputs a signal according to the game operation input thus accepted, and a controller that performs processing of:

(a) starting accepting a bet from the plurality of stations, (b) displaying on the display an instructional image for an operation input to end accepting a bet from the plurality of stations, in response to a first predetermined time period elapsing since starting accepting bets from the plurality of stations, and (c) sending a bet end signal to each of the plurality of stations and advancing a game, in a case where a signal indicating that an operation input to end accepting the bet has been received from the input device, wherein a betting operation becomes impossible and an image indicating that acceptance of bets has ended is displayed on a station display, in each of the plurality of stations receiving the bet end signal, wherein (c) advancing the game includes:

displaying on the display an image indicating a target card placement area on which the dealer should place a card from among the plurality of card placement areas at a time when the dealer attempts to place a card on any one of the plurality of card placement areas; and illuminating an illumination device corresponding to the target card placement area among the plurality of illumination devices when the card is not placed on the target card placement area within a second predetermined time period.

* * * * *